United States Patent
Strater et al.

(10) Patent No.: US 12,413,980 B2
(45) Date of Patent: *Sep. 9, 2025

(54) PRACTICAL EASYCONNECT ONBOARDING OF EXTENDERS

(71) Applicant: ARRIS Enterprises LLC, Suwanee, GA (US)

(72) Inventors: Jay Strater, San Diego, CA (US); Kurt A. Lumbatis, Dacula, GA (US); Gregory N. Nakanishi, San Diego, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/961,739

(22) Filed: Oct. 7, 2022

(65) Prior Publication Data

US 2023/0132077 A1 Apr. 27, 2023

Related U.S. Application Data

(60) Provisional application No. 63/270,126, filed on Oct. 21, 2021.

(51) Int. Cl.
*H04W 12/50* (2021.01)
*H04W 12/71* (2021.01)
(Continued)

(52) U.S. Cl.
CPC ........... *H04W 12/50* (2021.01); *H04W 12/71* (2021.01); *H04W 48/08* (2013.01); *H04W 48/16* (2013.01);
(Continued)

(58) Field of Classification Search
CPC ....... H04L 12/28–2838; H04L 2012/284–285; H04L 41/08–344; H04W 12/009–80;
(Continued)

(56) References Cited

U.S. PATENT DOCUMENTS

2019/0373464 A1* 12/2019 Chari ................... H04W 12/06
2023/0224703 A1* 7/2023 Strater ................. H04W 12/50

OTHER PUBLICATIONS

International Search Report and the Written Opinion of the International Searching Authority dated Jan. 18, 2023 in International (PCT) Application No. PCT/US2022/046003.
(Continued)

*Primary Examiner* — Timothy J Weidner
(74) *Attorney, Agent, or Firm* — Wenderoth, Lind & Ponack, L.L.P.

(57) ABSTRACT

A client device is provided for use with a user, a network extender device and a gateway device. The client device includes: a memory; a graphic user interface configured to provide an instruction to the user to place the client device within a predetermined distance from the network extender device; and a processor configured to execute instructions stored on the memory to cause the client device to: obtain the backhaul credentials from the wireless network; obtain the extender identification data from the network extender device; instruct the graphic user interface to provide the instruction to the user to place the client device within a predetermined distance from the network extender device; communicate with the network extender device based on the extender identification data; and provide the backhaul credentials to the network extender device to enable the network extender device to join the wireless network.

18 Claims, 14 Drawing Sheets

(51) Int. Cl.
*H04W 48/08* (2009.01)
*H04W 48/16* (2009.01)
*H04W 76/15* (2018.01)
*H04W 76/38* (2018.01)
*H04W 84/12* (2009.01)
*H04W 88/02* (2009.01)
*H04W 88/08* (2009.01)
*H04W 88/12* (2009.01)
*H04W 92/02* (2009.01)
*H04W 92/10* (2009.01)
*H04W 92/12* (2009.01)

(52) U.S. Cl.
CPC ........... *H04W 76/15* (2018.02); *H04W 76/38* (2018.02); *H04W 84/12* (2013.01); *H04W 88/02* (2013.01); *H04W 88/085* (2013.01); *H04W 88/12* (2013.01); *H04W 92/02* (2013.01); *H04W 92/10* (2013.01); *H04W 92/12* (2013.01)

(58) Field of Classification Search
CPC ... H04W 16/18–26; H04W 40/005–38; H04W 48/02–20; H04W 60/005–06; H04W 64/003–006; H04W 76/10–50; H04W 84/02–16; H04W 88/02–12; H04W 92/02–04; H04W 92/08–12; H04W 92/16–22
See application file for complete search history.

(56) References Cited

OTHER PUBLICATIONS

International Preliminary Report on Patentability issued Apr. 23, 2024, in International (PCT) Application No. PCT/US2022/046003.

* cited by examiner

PRACTICAL EASYCONNECT ONBOARDING OF EXTENDERS

BACKGROUND

Embodiments of the disclosure relate to onboarding an extender to a gateway device.

SUMMARY

Aspects of the present disclosure are drawn to a client device for use with a user, a network extender device, and a gateway device, the network extender device having extender identification data associated therewith, the gateway device being configured to establish and maintain a wireless network and having backhaul (BH) credentials associated therewith and being additionally configured to provide the backhaul credentials, the client device including: a memory; a graphic user interface configured to provide an instruction to the user to place the client device within a predetermined distance from the network extender device; and a processor configured to execute instructions stored on the memory to cause the client device to: obtain the BH credentials of the wireless network; obtain the extender identification data from the network extender device; instruct the graphic user interface to provide the instruction to the user to place the client device within a predetermined distance from the network extender device; communicate with the network extender device based on the extender identification data; and provide the BH credentials to the network extender device to enable the network extender device to join the wireless network.

In some embodiments, the extender identification data includes a QR code from the network extender device, client device further including: a camera configured to image the QR code, wherein the processor is configured to execute instructions stored on the memory to cause the client device to further obtain the extender identification data from the network extender device by instructing the camera to image the QR code.

In some further embodiments, the processor is configured to execute instructions stored on the memory to cause the client device to further communicate with the gateway device to verify that the network extender device has joined the wireless network.

In some further embodiments, the graphic user interface is additionally configured to provide an instruction to the user to perform a second protocol to join the network extender device with the wireless network, and wherein the processor is configured to execute instructions stored on the memory to cause the client device to: start a timer to count down for a predetermined time after providing the BH credentials to the network extender device to enable the network extender device to join the wireless network; and instruct the graphic user interface to provide the instruction to the user to perform the second protocol to join the network extender device with the wireless network if the network extender device has not been verified to have joined the wireless network after expiration of the timer.

In some embodiments, the client device is additionally used with the gateway device having a country code therein and being configured to provide the country code, and is additionally used with the network extender device being configured to transmit data at first transmission power and to transmit data a second transmission power based on the country code, the second transmission power being greater than the first transmission power, wherein the processor is configured to execute instructions stored on the memory to cause the client device to further: obtain the country code from the gateway device; and provide the country code to the network extender device thereby causing the network extender device to transmit data at the second transmission power.

In some embodiments, the processor is configured to execute instructions stored on the memory to cause the client device to obtain the BH credentials from the wireless network in a secure manner.

Other aspects of the present disclosure are drawn to a method of operating a client device with a user, a network extender device and a gateway device, the network extender device having extender identification data associated therewith, the gateway device being configured to establish and maintain a wireless network and having BH credentials associated therewith and being additionally configured to provide the BH credentials, the method including: obtaining, via a processor configured to execute instructions stored on a memory, the BH credentials from the wireless network; obtaining, via the processor, the extender identification data from the network extender device; instructing, via a processor, a graphic user interface to provide an instruction to the user to place the client device within a predetermined distance from the network extender device; communicating, via the processor, with the network extender device based on the extender identification data; and providing, via a processor, the BH credentials to the network extender device to enable the network extender device to join the wireless network.

In some embodiments, wherein the extender identification data includes a QR code from the network extender device, the method further including obtaining, via a camera, the extender identification data from the network extender device by imaging the QR code.

In some further embodiments, the method further includes communicating, via the processor, with the gateway device to verify that the network extender device has joined the wireless network.

In some further embodiments, the method further includes: starting, via the processor, a timer to count down for a predetermined time after providing the BH credentials to the network extender device to enable the network extender device to join the wireless network; and instructing, via the processor, the graphic user interface to provide an instruction to the user to perform a second protocol to join the network extender device with the wireless network if the network extender device has not been verified to have joined the wireless network after expiration of the timer.

In some embodiments, the method is additionally used with the gateway device having a country code therein and being configured to provide the country code, and is additionally used with the network extender device being configured to transmit data at first transmission power and to transmit data a second transmission power based on the country code, the second transmission power being greater than the first transmission power, the method further including: obtaining, via the processor, the country code from the gateway device; and providing, via the processor, the country code to the network extender device thereby causing the network extender device to transmit data at the second transmission power.

In some embodiments, wherein the obtaining, via the processor configured to execute instructions stored on the memory, the BH credentials from the wireless network includes obtaining the BH credentials from the wireless network in a secure manner.

Other aspects of the present disclosure are drawn to a non-transitory, computer-readable media having computer-readable instructions stored thereon, the computer-readable instructions being capable of being read by a client device for use with a user, a network extender device and a gateway device, the network extender device having extender identification data associated therewith, the gateway device being configured to establish and maintain a wireless network and having BH credentials associated therewith and being additionally configured to provide the BH credentials, wherein the computer-readable instructions are capable of instructing the client device to perform the method including: obtaining, via a processor configured to execute instructions stored on a memory, the BH credentials from the wireless network; obtaining, via the processor, the extender identification data from the network extender device; instructing, via a processor, a graphic user interface to provide an instruction to the user to place the client device within a predetermined distance from the network extender device; communicating, via the processor, with the network extender device based on the extender identification data; and providing, via a processor, the BH credentials to the network extender device to enable the network extender device to join the wireless network.

In some embodiments, wherein the extender identification data includes a QR code from the network extender device, and wherein the computer-readable instructions are capable of instructing the client device to perform the method further including obtaining, via a camera, the extender identification data from the network extender device by imaging the QR code.

In some further embodiments, wherein the computer-readable instructions are capable of instructing the client device to perform the method further include communicating, via the processor, with the gateway device to verify that the network extender device has joined the wireless network.

In some further embodiments, wherein the computer-readable instructions are capable of instructing the client device to perform the method further including: starting, via the processor, a timer to count down for a predetermined time after providing the BH credentials to the network extender device to enable the network extender device to join the wireless network; and instructing, via the processor, the graphic user interface to provide an instruction to the user to perform a second protocol to join the network extender device with the wireless network if the network extender device has not been verified to have joined the wireless network after expiration of the timer.

In some embodiments, the non-transitory, computer-readable media is additionally used with the gateway device having a country code therein and being configured to provide the country code, and is additionally used with the network extender device being configured to transmit data at first transmission power and to transmit data a second transmission power based on the country code, the second transmission power being greater than the first transmission power, wherein the computer-readable instructions are capable of instructing the client device to perform the method further including: obtaining, via the processor, the country code from the gateway device; and providing, via the processor, the country code to the network extender device thereby causing the network extender device to transmit data at the second transmission power.

In some embodiments, wherein the computer-readable instructions are capable of instructing the client device to perform the method wherein the obtaining, via the processor configured to execute instructions stored on the memory, the BH credentials from the wireless network includes obtaining the BH credentials from the wireless network in a secure manner.

BRIEF SUMMARY OF THE DRAWINGS

The accompanying drawings, which are incorporated in and form a part of the specification, illustrate example embodiments and, together with the description, serve to explain the principles of the disclosure. In the drawings:

FIG. 1A illustrates a prior art communication system at a time to;

DETAILED DESCRIPTION

Figure 1A:
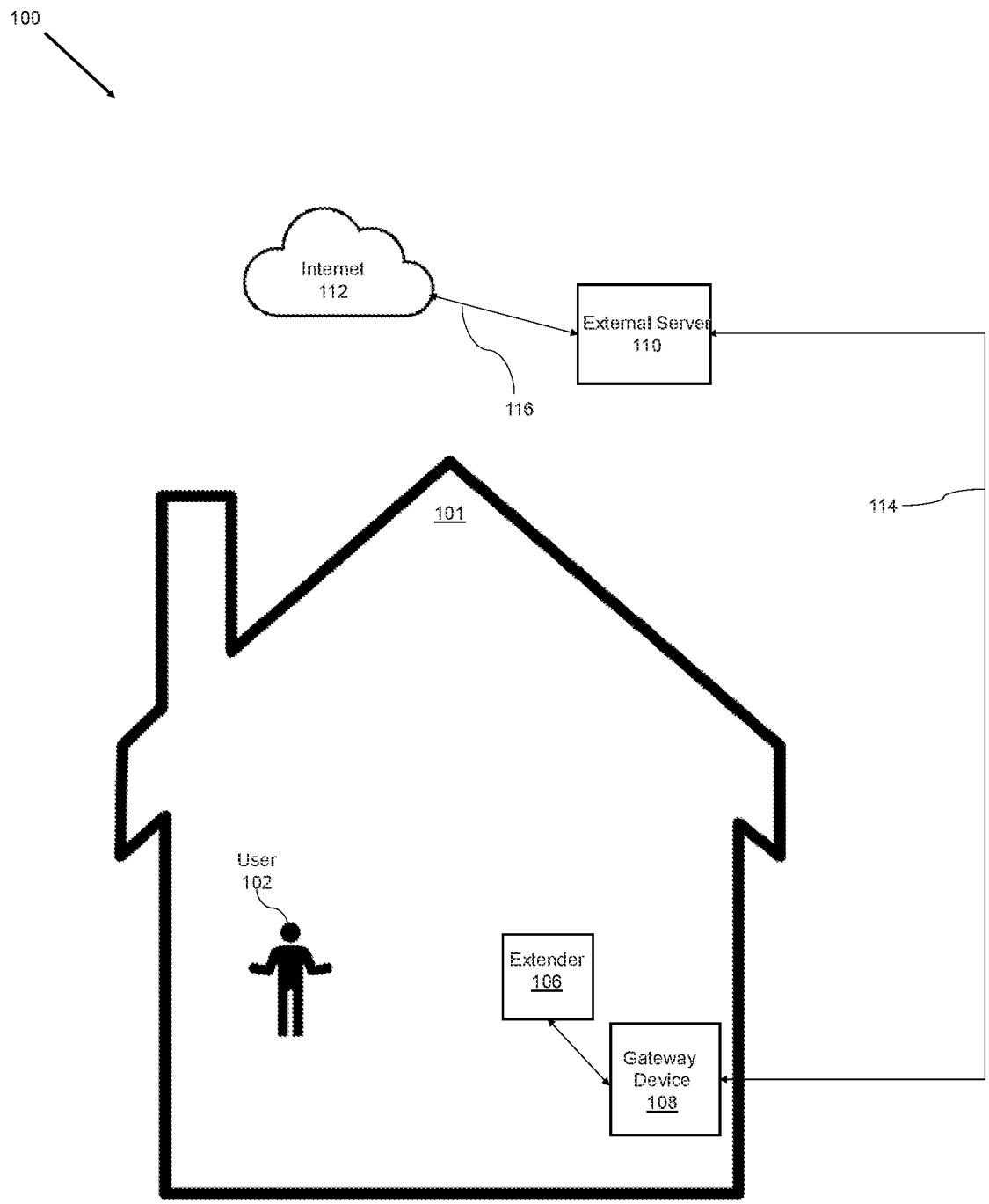

FIG. 1A illustrates a prior art communication system 100, at a time to.

As shown in the figure, communication system 100 includes a residence 101, a user 102, an extender 106, a gateway device 108, an external server 110, Internet 112, and communication channels 114 and 116.

Gateway device 108 is an electronic device that has a wide area network (WAN) connection and supports a local area network (LAN) at a consumer premises. Gateway device 108 is a device that combines the functions of a modem and a router. A modem is a device that connects to your cable or phone lines and translates the data or information from the Internet to your computer or connected device. A router is a device that works with your modem to create and manage a wireless network so as to wirelessly take the data coming through the modem and sends it wirelessly to multiple devices like smart phones, tablets, gaming consoles, and computers. The consumer premises can include a residential dwelling, an office, or any other business space of a user, such as residence 101. The terms home, office, and premises may be used synonymously herein.

Gateway device 108 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED) egress queuing, TCP/UDP flow control), bandwidth usage policing, dynamic load balancing, and routing.

Further, it should be noted that gateway device 108 is able to communicate with external server 110 via communication channel 114, which may optionally be a wireless communication system, such as 4G, or 5G, and further is able to connect to Internet 112 via communication channel 116.

Gateway device 108 serves as a gateway or access point to Internet 112 for one or more electronic devices.

A wireless access point (WAP), or more generally known as an access point (AP), is a networking hardware device that allows other Wi-Fi devices to connect to a Wi-Fi network. It resides in the gateway and wireless extender devices. A service set ID (SSID) is an identification (in IEEE 802.11) that is broadcast by access points in beacon packets to announce the presence of a wireless network access point for the SSID. SSIDs are customizable IDs that can be zero to 32 bytes, and can be in a natural language, such as English. In residence 101, gateway device 108 and extender 106 are access points.

Wi-Fi Protected Setup (WPS) is a WiFi-Alliance (WFA) standard to onboard a wireless device (e.g. wireless client or new wireless extender via its backhaul (BH) station (bSTA)) on a home wireless network. The point of WPS is to allow home users who know little of wireless security and may be initiated by the available security options to set up Wi-Fi Protected Access, as well as making it easy to add new devices to an existing wireless network without entering long passphrases. Typically, WPS involves push button operations on existing wireless network device's AP and on the wireless network client device (STA or new wireless extender's bSTA).

WiFi-Alliance (WFA) EasyConnect (EC) offers a more secure way of onboarding an extender to a gateway device than via WPA (WPS). EC requires a secure off-line means of getting bootstrap information shared between the device initiating and responding to EC authentication that follows. The standard does not specify this but leaves it to the implementors.

As mentioned above, gateway device 108 creates and manages a wireless network for wireless devices within residence 101. However, the wireless network is limited in distance, wherein some wireless devices may be unable to connect to gateway device 108 while located in certain locations of residence 101. For example, sometimes gateway device 108 may be poorly located as people only want it in their office on corner of home. To support a whole home wireless network reach, the reach of the wireless network may be expanded with the addition of extenders. An extender is a wireless network device that is able to join the wireless network of gateway device 108, extend the reach of the wireless network within residence 101, and transpond data between client devices within residence 101 and gateway device 108 in situations when those client devices are not sufficiently close to gateway device 108 so as to communicate directly with gateway device 108. For extenders to provide this feature, they must first join the network of the gateway device, or the wireless network device housing the wireless network controller as mentioned above. This will be described in greater detail with reference to FIG. 1B.

Figure 1B:
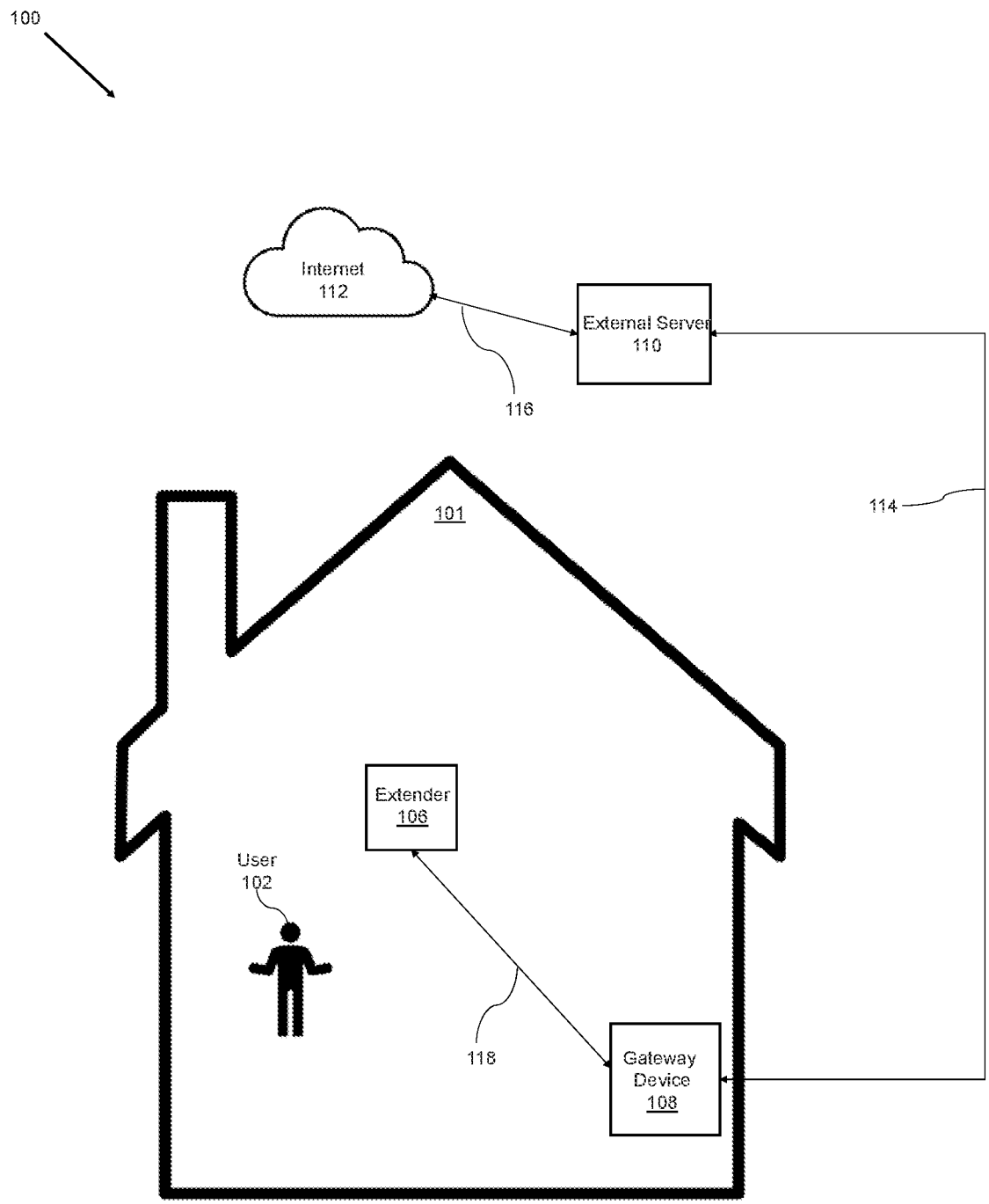
FIG. 1B illustrates the prior art communication system of FIG. 1A at a time $t_1$.

FIG. 1B illustrates communication system 100 of FIG. 1A at a time $t_1$. As shown in FIG. 1B, extender 106 has joined the wireless network of gateway device 108, i.e., onboarded onto the wireless network of gateway device 108, as shown by communication channel 118.

There are a few conventional ways of onboarding an extender to a gateway device in a Wi-Fi network using EC.

In a first conventional onboarding approach, EasyMesh (EM) Release 3 (R3) makes use of EC for secure extender onboarding, involving out of band EC bootstrap info collection and sharing with EM control logic as the EC Configurator. It provides a bootstrapping example of using a client device, such as a smart phone, to scan a QR code containing the EC bootstrap credentials on the new extender then sharing this with EM controller. The EM controller then uses its network MAP Agents (e.g. on gateway and any already on-boarded extenders) to detect the new extender operating on the channel(s) it provides in the EC URI information the controller has, after having the agents start advertising a DPP Configurator Connectivity Element (CCE) in their beacons.

This presumes that the new extender starts broadcasting a Device Provisioning Protocol (DPP) Presence Announcement message (known as "chirp") on the channel(s) it has specified in its bootstrap URI after hearing CCE in beacons. It should be noted that when the URI includes a channel specification it must also include an associated operating class. The specified channel(s) are optional but highly recommended as they shorten on-boarding time by letting the EC Initiator know the band/channel(s) on which the new extender may be broadcasting. Authentication is then initiated by the EM controller, as proxied by the MAP Agent that detects the new extender. EC configuration follows as initiated by the new extender to get the new extender wireless network BH credentials. The new extender then establishes a BH connection to a MAP Agent. This is followed by the new extender getting its basic service set (BSS) configuration information for operation of its fronthaul (FH) BSS via an EM controller AP-Autoconfig messaging protocol.

There is a problem with this first conventional onboarding approach. In particular, consider the situation wherein extender 106 is newly purchased by user 102, and is to be joined, or onboarded, onto the wireless network of gateway device 108. When onboarding extender 106, extender 106 requires another extender or a client device to broadcast a Device Provisioning Protocol (DPP) Presence Announcement message, to go through DPP authentication, and DPP configuration message exchanges prior to having Wi-Fi configuration with the wireless network. This process is straight forward if the deployment is to a known country or region in which the regulatory channel and transmission power levels are uniform. However, it is complicated if the deployment is to a region where regulatory channel and transmission power levels vary considerably by country (e.g. CALA) or for general world-wide deployment. In the latter case, extender 106 will have significant Wi-Fi restrictions until it gets configured with its specific country code to be able to look up its country specific channel and transmission power allowances. Currently, extender 106 country code configuration will not occur until after onboarding and after it establishes Wi-Fi configuration with the communication system 100. A solution is needed to address these limitations and concerns.

A second conventional onboarding approach includes 1) using a client device, such as a smart phone, to scan a QR code containing the EC bootstrap credentials on the new extender; and then 2) have this client device act as EC Configurator and initiate authentication of the EC on-boarding operation. EC configuration will then follow as initiated from new extender. This assumes a user with client device is moved near the new extender to detect the new extender which is broadcasting a device provisioning protocol (DPP) Presence Announcement message on the channel(s) it has specified in its bootstrap URI.

For the configuration step, the client device must collect BH credential information from the network controller (e.g. on the gateway or existing network extender) via a secure connection to the network controller. The client device may then pass the BH credential information to the new extender to be used to establish a BH connection to the gateway (or another existing network controller). Once establishing a BH connection to the gateway or existing network extender, the new extender can get configured from the controller for its fronthaul (and possibly BH) BSS configuration information. This will occur via AP-Autoconfig messaging if in an EM solution and via other signaling mechanisms if in non-EM solution. This approach avoids the need for EM R3 support in all network devices. It also allows for increased DPP authentication and configuration success when new extender transmission power is very low as the client device can be very near to the new extender.

There is a problem with this second conventional onboarding approach. In particular, this EC onboarding approach, and even the first conventional onboarding approach discussed previously, requires the new extender to know when to start broadcasting a DPP Presence Announcement message. This could happen right after the new device is booted, wherein a BH connection has not been provisioned yet. However, without a BH connection being established, wherein the new extender may not connect to the Internet through the gateway device, this can lock the new extender into an EC onboarding state when such support is not available without a solution to address it.

In a third conventional onboarding approach, a client device is again used for secure EC on-boarding of a new extender if that new extender has QR code with EC bootstrap credentials. In this case, the client device acts as EC Configurator for authentication initiator and configuration responder of the new extender on-boarding operation. This assumes a user with the client device is near the new extender to detect the new extender broadcasting a DPP Presence Announcement message on the channel(s) it has specified in its bootstrap URI. For this configuration step, the client device is assumed to know the service set identifier (SSID) FH credential information (typically common to all BSS) of the wireless network and can use this to directly configure the new extender, wherein there is no need for communication with the gateway device.

There is a problem with this third conventional onboarding approach. In particular, it requires secure communication between the client device and the gateway device in order for the client device to collect the BH credential information of the gateway device, particularly if such communication passes outside of the home in the path between the gateway device and the client device. Careful design consideration is needed to achieve this.

It should be noted that additional extenders may be added to the wireless network in a similar manner as discussed above. Extenders may be added in order to further extend the reach of the network of gateway device 108. This will be described in greater detail with reference to FIGS. 1C-D.

Figure 1C:
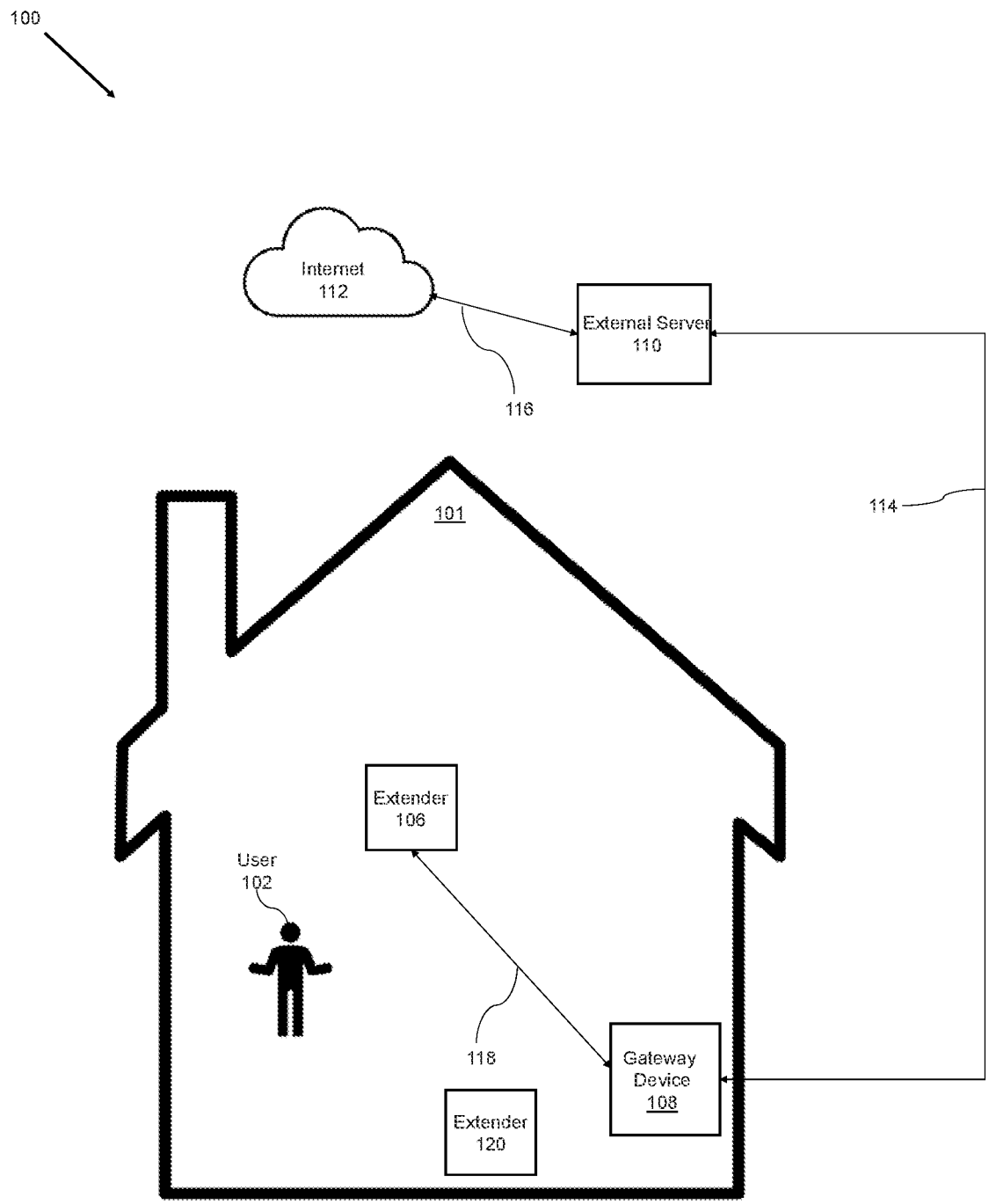
FIG. 1C illustrates the prior art communication system of FIG. 1B with an additional extender being added via the gateway device.

FIG. 1C illustrates prior art communication system 100 with an additional extender 120 being added via gateway device 108.

As shown in the figure, extender 120 joins the network of gateway device 108 by way of gateway device 108. In particular, user 102 may onboard extender 120 onto the network of gateway device 108 by any of the methods discussed above with reference to FIG. 1B.

In the case of FIG. 1C, extender 120 joins the network of gateway device 108 by onboarding directly onto gateway device 108. However, it should be noted that an extender may join the wireless network of gateway device 108 without onboarding directly to gateway device 108. In particular, an extender may join the wireless network of gateway device 108 by way of onboarding onto another extender that is currently joined in the network of gateway device 108. This will be described in greater detail with reference to FIG. 1D.

Figure 1D:
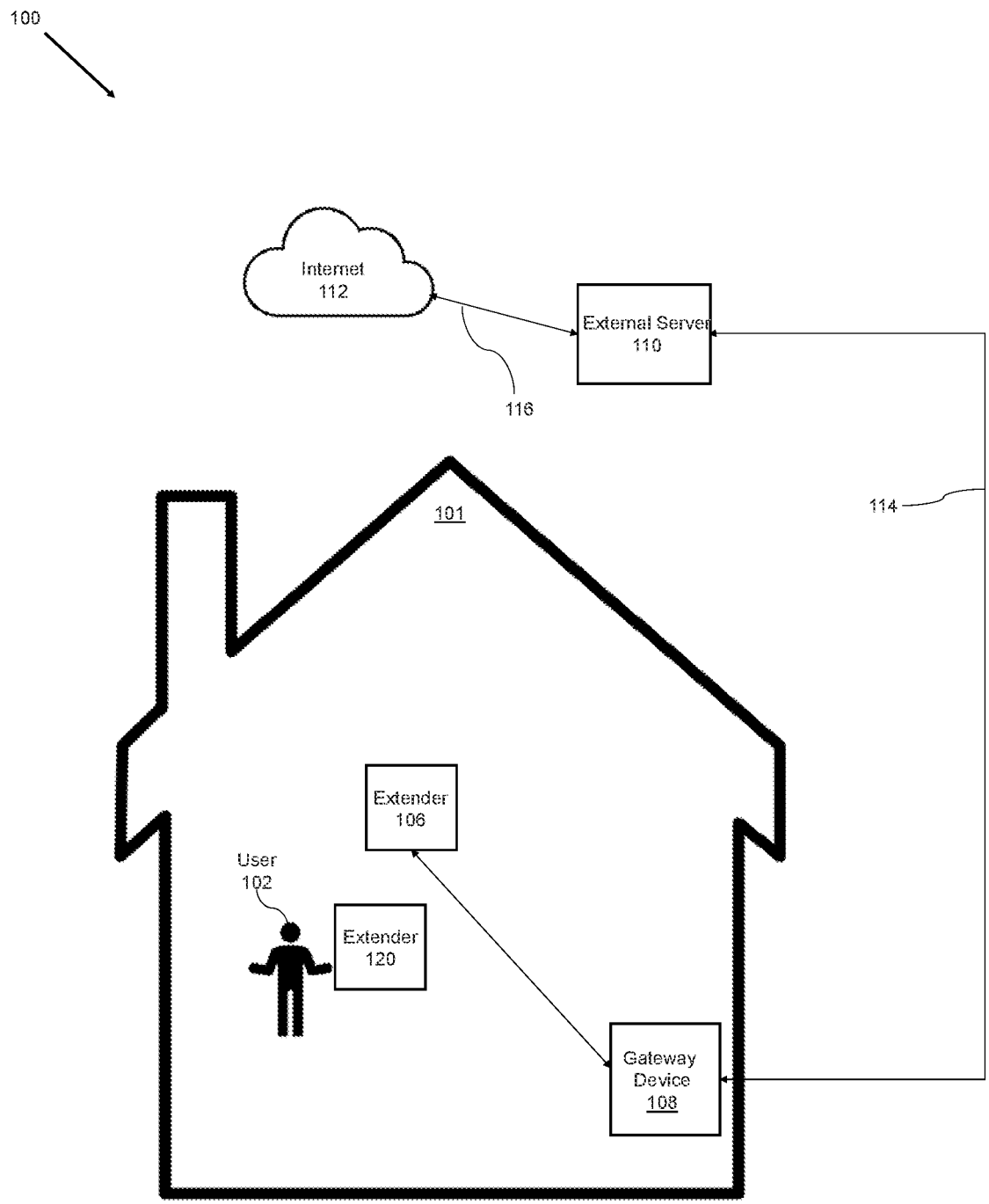
FIG. 1D illustrates another example of the prior art communication system of FIG. 1B with an additional extender being added via the previously onboarded extender.

FIG. 1D illustrates another example of prior art communication system 100 with an additional extender being added via the previously onboarded extender 106.

As shown in the figure, extender 120 joins the network of gateway device 108 by way of previously onboarded extender 106. In particular, user 102 may onboard extender 120 onto the network of gateway device 108 by any of the methods discussed above with reference to FIG. 1B.

In the case of FIG. 1D, extender 120 joins the network of gateway device 108 by onboarding onto gateway device 108 by way of previously onboarded extender 106.

It should be noted that in the above-discussion with reference to FIGS. 1A-D, gateway device 108 sets up and manages the wireless network. However, the wireless network in actually is typically set up and managed by a network controller, which may reside in any extender, router or gateway device within the wireless network. To simplify the discussion, in the above-described system of FIGS. 1A-D, the network controller resides within gateway device 108. With this in mind, each time a new extender is onboarded onto the wireless network, the new extender in the system discussed above with reference to FIGS. 1A-D, should onboard onto gateway device 108, either directly or via a currently onboarded extender. However, if the network controller were to reside in another device of the wireless network, each time a new extender is onboarded onto the wireless network, the new extender in the system will still need to communicate with the network controller, either directly or via a currently onboarded extender.

What is needed is a system and method for onboarding an extender onto a wireless network in a manner that addresses the problems associated with the conventional approaches discussed above.

A system and method in accordance with the present disclosure onboards an extender onto a wireless network using a client device.

An example system and method for onboarding an extender onto a wireless network using a client device in accordance with aspects of the present disclosure provides a solution to the problem associated with the first conventional method of onboarding an extender discussed above. In particular, for EC onboarding in general, a channel is chosen that is allowed for all countries in the regional of deployment. If more than one channel exists, only a few (e.g. two) channels are chosen to provide robustness should one of the channels have high interference. It should be noted that limiting the number of channels, reduces the overall the on-boarding time. For example, the chosen channel may be channel 6 in US operating class 12 (2.4G band). This channel information may be added in the EC QR code bootstrap URI of the extender.

Further, a minimum transmission power restriction may be imposed for the channel(s) that is allowed by all countries in the regional of deployment. The user may be directed to keep the client device near the new extender to address low transmission power restriction prior to the new extender getting its country code. Initial, regional channel and transmission power restrictions will be removed after the extender receives the country code from the client device. Then the extender can operate at the transmission power level allowed by that country code.

For EC onboarding using the second conventional onboarding approach described above, the client device that is used to assist the extender device to onboard may be able to learn the country in which the wireless network is operating. In particular, the client device may expand its BH credential request to the network controller to include the country code (CC) and to receive BH credential and CC in the response from the controller. The client device may then provide the CC to the onboarding extender device. The new extender may then extract and use the onboarding client device provided CC. This assumes the extender is configured to look for the CC as defined above. In this case, the new extender can use the CC to set its device CC value and start operating with the full transmission power allowed by its CC configuration without having to wait until after establishing a BH connection with the gateway or existing extender.

The result of such functionality is that a new extender would not need to potentially be placed close to the gateway device or an existing extender for DPP provisioning when it is being DPP provisioned by the onboarding client device. Instead, it could be placed at a location that is a typical wireless BH distance from the gateway device. This is not the case for the EM R3 DPP solution, as it has no option for getting its device CC value prior to BH connection with the gateway device.

For EC onboarding in general, an approach to enabling or disabling EC is needed to avoid locking the new extender into a perpetual EC onboarding state when it has not been provisioned with the BH of the gateway device yet and no EC Configurator is present. In accordance with aspects of the present disclosure, one solution is to have DPP enabled by default upon initial bootup of the new extender when the BH of the gateway device has not yet been not configured and until DPP is successfully EC configured in the new extender device, and to include a post-boot timeout period in which DPP is disabled if EC DPP is not successfully onboarded in time. This approach is somewhat inflexible and impedes timely onboarding if the user wants to initiate a different method, such as WPS onboarding.

In accordance with aspects of the present disclosure, a more flexible solution is to have DPP enabled by default upon initial boot of the new extender, when the extenders BH is not yet configured and until EC DPP is configured, and to include a secondary onboarding process, for example via WPS PBC, to disable DPP onboarding if it is no longer desired or WPS onboarding can be pursued instead.

The onboarding client device can guide the user through this process. The onboarding client device can check for EC (DPP) onboarding success by looking for the new extender in the network topology (via controller access) following successful DPP configuration and can then report this to the user. If EC (DPP) onboarding fails within a predetermined timeout period, the onboarding client device can then provide the user with the option to try a secondary onboarding process, a non-limiting example of which includes a WPS push button Configuration (PBC) to onboard with the gateway device. Assuming the user pursues WPS PBC, the client device should also monitor as to whether the extender has joined the wireless network for example by detecting a successful WPS provisioning indication, or a WPS LED pairing indication. The client device can also provide an indication to the user to move the new extender closer to gateway device or existing extenders if needed because of transmission power restrictions. The device MAC address can also be included in the DPP bootstrap URI. This should be used to help the onboarding client device determine if the new extender was successfully provisioned by looking for its MAC address in network-controller retained topology information.

The second conventional onboarding approach described above requires the gateway device (or other network controller) to ensure that the user operating the onboarding client device has entered a valid user-name (UN) and password (PW) before providing wireless network BH credentials to the client device. This may involve the controller validating the onboarding client device UN and PW with a network server that the onboarding client device is logged into, and which communicates with the gateway device. Additional authorization could be provided to validate that the onboarding client device UN and PW is associated with the client device, non-limiting examples of which include the MAC address or serial number of the client device, on which the gateway device (or other home network controller) resides. It should be noted that the home network controller may be the gateway or some other existing extender. The BH credentials should also be encrypted through known encrypting methods for privacy reasons if sent indirectly between gateway and the onboarding client device.

An example system and method for onboarding an extender onto a wireless network using a client device in accordance with aspects of the present disclosure will now be described in greater detail with reference to FIGS. 2-4.

Figure 2:
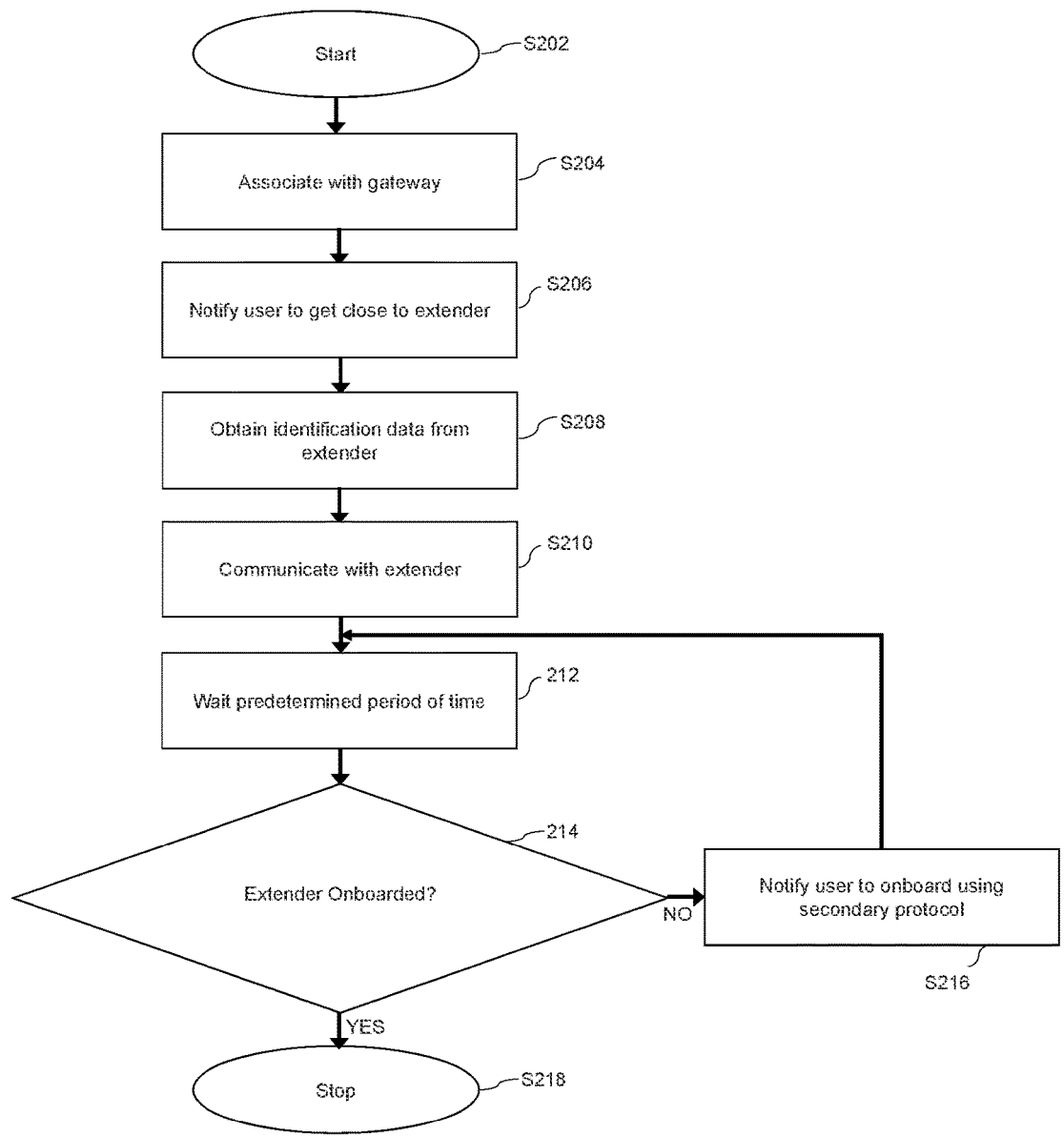
FIG. 2 illustrates a method for onboarding an extender in accordance with aspects of the present disclosure.

FIG. 2 illustrates an algorithm 200 to be executed by a processor for onboarding an extender in accordance with aspects of the present disclosure.

As shown in FIG. 2, algorithm 200 starts (S202), and the client device joins the network (S204). This will be described in greater detail with reference to FIGS. 3A, 3B, and 4.

Figure 3A:
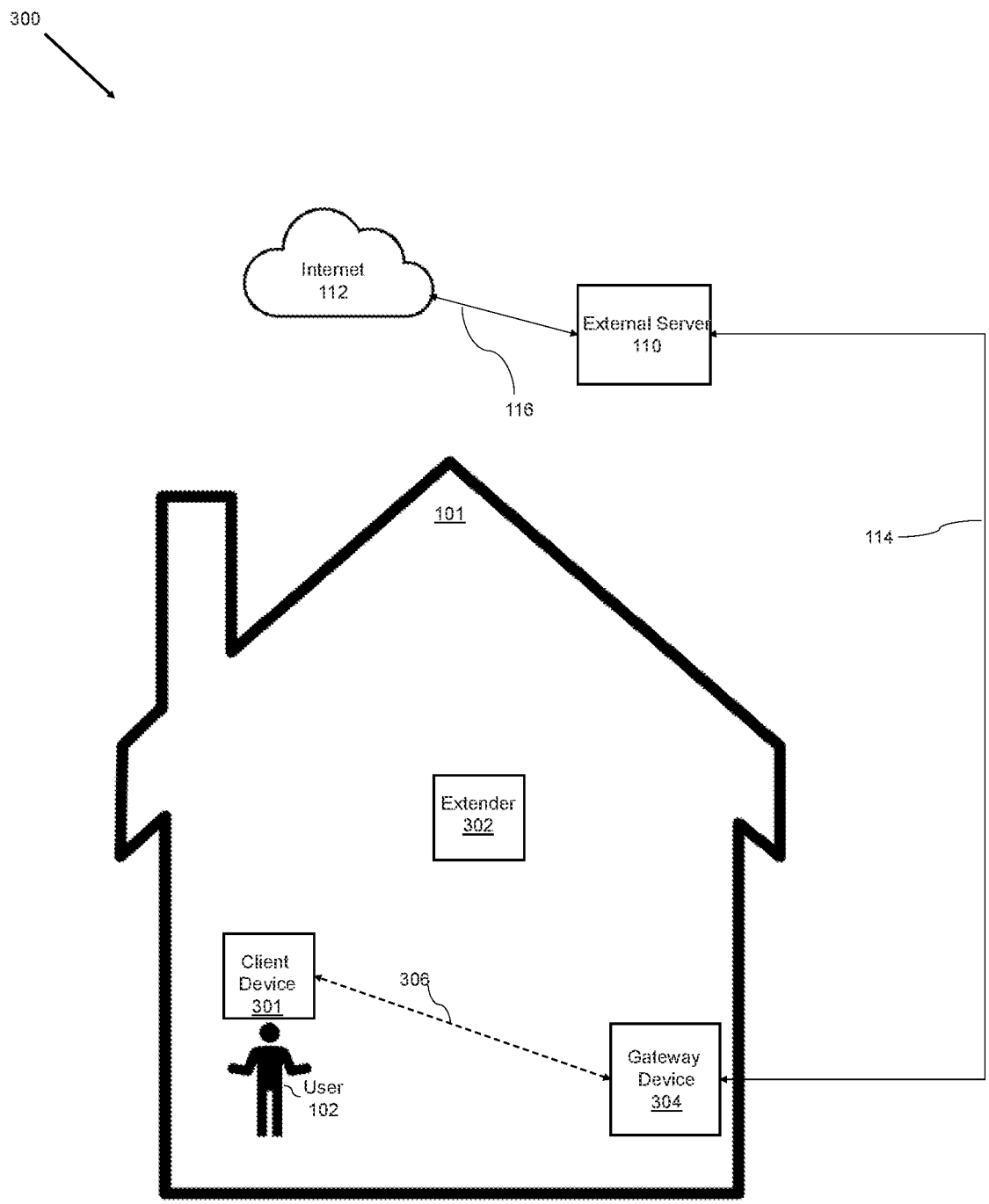
FIG. 3A illustrates a communication system at a time $t_2$ in accordance with aspects of the present disclosure.

FIG. 3A illustrates a communication system 300 at a time $t_2$ in accordance with the present disclosure.

As shown in FIG. 3A, communication system 300 includes residence 101, user 102, a client device 301, an extender 302, a gateway device 304, external server 110, Internet 112, and communication channels 114 and 116.

Residence 101 now includes client device 301. Client device 301 can be a desktop computer, laptop computer, electronic tablet device, smart phone, appliance, or any other so-called "Internet of things" equipped devices that are equipped to communicate information. Further, residence 101 is equipped with a new extender, extender 302, and a new gateway device, gateway device 304. It should be noted that at this point, extender 302 has not joined the wireless network of gateway device 304. Further, for purposes of discussion, user 102 may place client device 301, for example in a manner based on hotspot help from client device 301, by extender 302 to start its onboarding. Client device 301 is still able to communicate with gateway device 304 for credential gathering needs. The starting point for the onboarding of extender 302 will actually occur at a later time, as discussed below with reference to FIG. 3C.

Client device 301 will join the wireless network of gateway device 304, shown as onboarding process 306.

For example, consider for purposes of discussion that user 102 has just purchased extender 302 for residence 101. User 102 will use client device 302 to assist in onboarding extender 302 onto gateway device 304. Prior to doing so, user 102 will have joined client device 301 with the wireless network of gateway device 304 through known secure onboarding methods, a non-limiting example of which includes using client device 301 to enter the username and password associated with gateway device 304. Joining the wireless network of gateway device 304 will allow client device 301 to gain access to the BH credentials (including the service set identifier (SSID) and password), the channel gateway device 304 is operating on, the country code, and any other information needed to onboard onto to gateway device 304. This will be described in greater detail with reference to FIGS. 3B and 4.

Figure 3B:
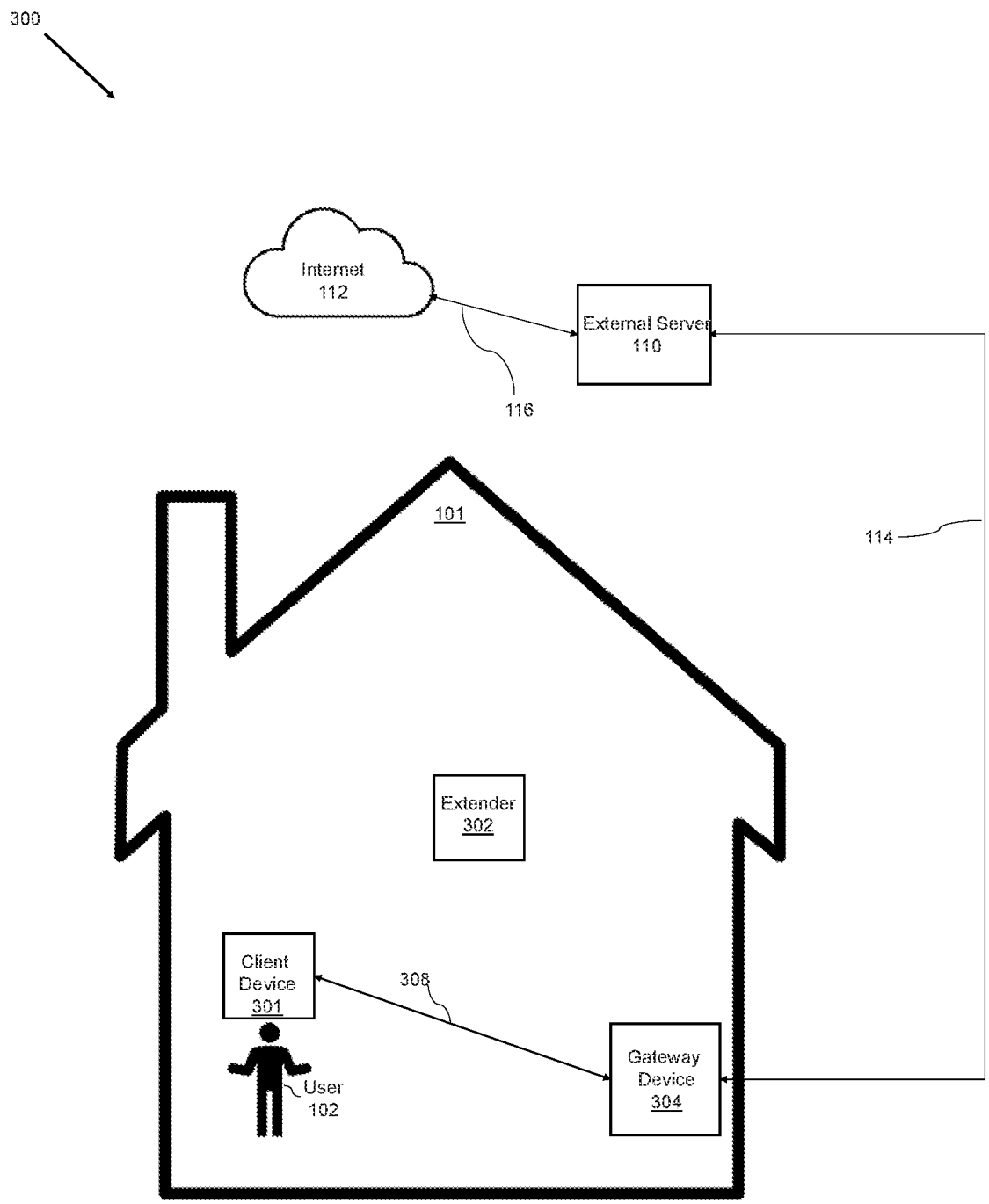
FIG. 3B illustrates the communication system of FIG. 3A at a time $t_3$ in accordance with aspects of the present disclosure.

FIG. 3B illustrates communication system 300 at a time $t_3$ in accordance with the present disclosure.

As shown in FIG. 3B, client device 301 is joined with the wireless network of gateway device 304 and is able to communicate with gateway device 304 via a communication channel 308.

Figure 4:
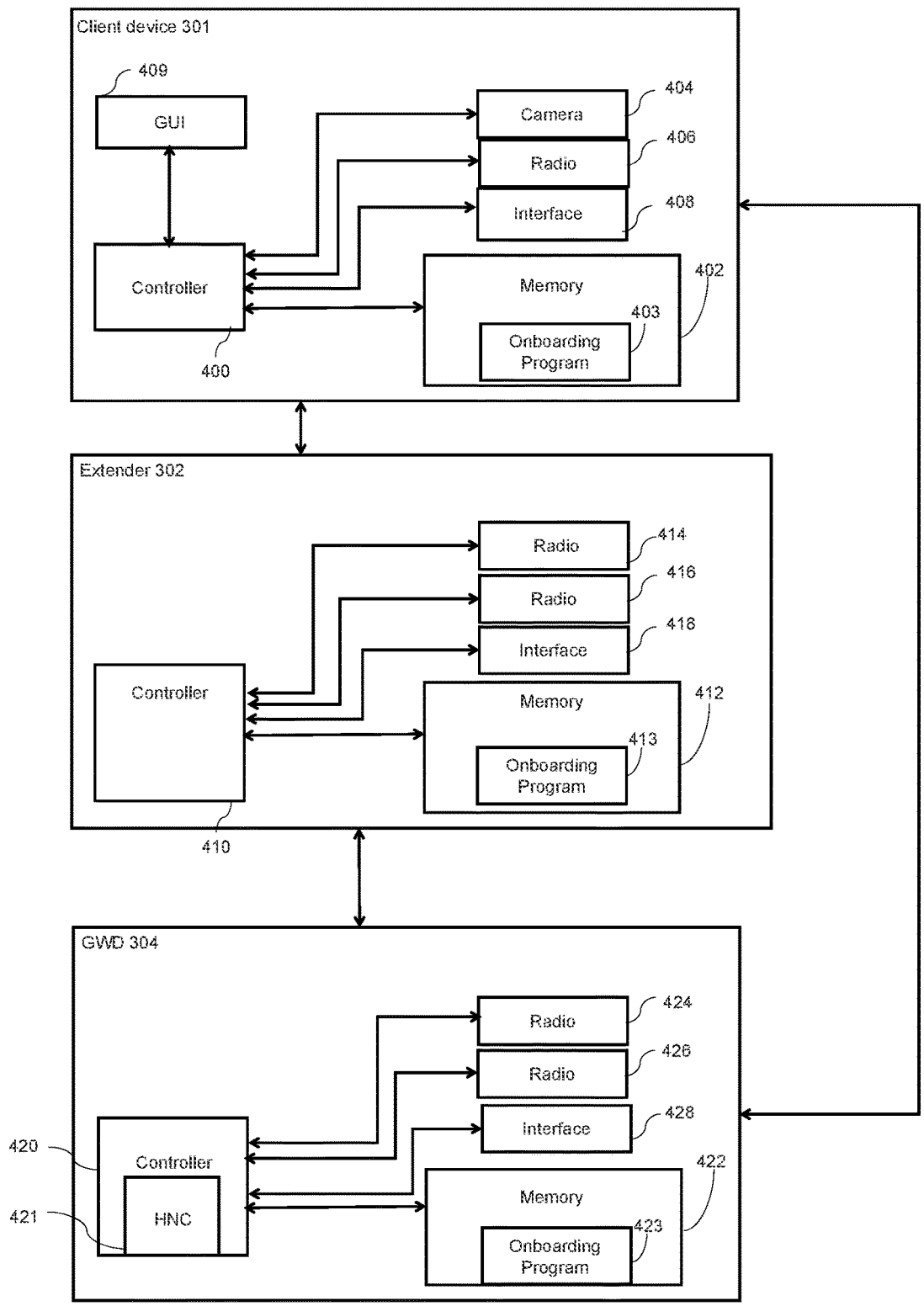
FIG. 4 illustrates an exploded view of a client device, an extender, and a gateway device in accordance with aspects of the present disclosure.

FIG. 4 illustrates an exploded view of client device 301, extender 302, and gateway device 304.

As shown in FIG. 4, client device 301 includes a controller 400; a memory 402, which has stored therein an onboarding program 403; a camera 404; at least one radio, a sample of which is illustrated as a radio 406; an interface 408; and a graphic user interface (GUI) 409.

In this example, controller 400, memory 402, radio 406, and interface 408 are illustrated as individual devices. However, in some embodiments, at least two of controller 400, memory 402, radio 406, and interface 408 may be combined as a unitary device. Further, in some embodiments, at least one of controller 400 and memory 402 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 400 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 301 in accordance with the embodiments described in the present disclosure.

Memory 402, as will be described in greater detail below, has instructions, including onboarding program 403, stored therein to be executed by controller 400 to allow client device 301 to: obtain the BH credentials from gateway device 304; obtain extender identification data from extender 302; provide the instructions on GUI 409 to user 102 to place client device 301 within a predetermined distance from extender 302; communicate with the extender 302 based on the extender identification data; and provide the BH credentials to extender 302 to enable extender 302 to join the wireless network of gateway device 304.

In some embodiments, memory 402, as will be described in greater detail below, has instructions, including onboarding program 403, stored therein to be executed by controller 400 to allow client device 301 to: further obtain the extender identification data from the extender 302 by instructing camera 404 to image the QR code.

In some further embodiments, memory 402, as will be described in greater detail below, has instructions, including onboarding program 403, stored therein to be executed by controller 400 to allow client device 301 to further communicate with gateway device 304 to verify that extender 302 has joined the wireless network of gateway device 304.

In some further embodiments, memory 402, as will be described in greater detail below, has instructions, including onboarding program 403, stored therein to be executed by controller 400 to allow client device 301 to: start a timer to count down for a predetermined time after providing the BH credentials to extender 302 to enable extender 302 to join the wireless network of gateway device 304; and instruct GUI 409 to provide the instruction to user 102 to use the second protocol to join extender 302 with the wireless network of gateway device 304 if extender 302 has not been verified to have joined the wireless network of gateway device 304 after expiration of the timer.

In some embodiments, memory 402, as will be described in greater detail below, has instructions, including onboarding program 403, stored therein to be executed by controller 400 to allow client device 301 to: obtain the country code from gateway device 304; and provide the country code to extender 302 thereby causing extender 302 to transmit data at the second transmission power.

In some embodiments, memory 402, as will be described in greater detail below, has instructions, including onboarding program 403, stored therein to be executed by controller 400 to allow client device 301 to obtain the BH credentials from gateway device 304 in a secure manner.

Camera 404 is any known device or system that is configured to provide a still image of an item, a non-limiting example of which is a digital camera.

Radio 406 may include a Wi-Fi WLAN interface radio transceiver that is operable to communicate with extender 302 and gateway device 304, as shown in FIG. 3A, and also may include a cellular transceiver operable to communicate with a cellular network. Radio 406 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 301 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Interface 408 can include one or more connectors, such as RF connectors, or Ethernet connectors, and/or wireless communication circuitry, such as 5G circuitry and one or more antennas.

GUI 409 may be any known device or system to display an interactive image to enable user 102 to interact with client device 301.

As shown in FIG. 4, extender 302 includes a controller 410; a memory 412, which has stored therein an onboarding program 413; at least one radio, a sample of which is illustrated as a radio 414 and a radio 416; and an interface 418.

In this example, controller 410, memory 412, radio 414, radio 416 and interface 418 are illustrated as individual devices. However, in some embodiments, at least two of controller 410, memory 412, radio 414, radio 416 and interface 418 may be combined as a unitary device. Further, in some embodiments, at least one of controller 410 and memory 412 may be implemented as a computer having tangible computer-readable media for carrying or having computer-executable instructions or data structures stored thereon.

Controller 410 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of extender 302 in accordance with the embodiments described in the present disclosure.

Memory 412, as will be described in greater detail below, has instructions, including onboarding program 413, stored therein to be executed by controller 410 to allow extender 302 to: communicate with client device 301 after being powered on; receive BH credentials, operating channel, and country code of gateway device 304 from client device 301; navigate a topology table of various country codes; matching the country code of gateway device 304 to the respective country code stored within the country code topology table; and establish a BH connection with gateway device 304.

Radios 414 and 416, may include a Wi-Fi WLAN interface radio transceiver that is operable to communicate with client device 301 and gateway device 304. Radios 414 and 416 include one or more antennas and communicate wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radios 414 and 416 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

In some embodiments, extender 302 will only have one radio. In this sample embodiment, extender 302 has two radios, radios 414 and 416, in order to communicate via multiple bandwidths, non-limiting examples of which include the 2.4 GHz band, 5 GHz band, and 6 GHz band.

Interface 418 can include one or more connectors, such as RF connectors, or Ethernet connectors, and/or wireless communication circuitry, such as 5G circuitry and one or more antennas.

As shown in FIG. 4, gateway device 304 includes a controller 420, which has stored therein a home network controller (HNC) 421; a memory 422, which has stored thereon an onboarding program 423; and at least one radio, a sample of which is illustrated as a radio 424 and a radio 426; and an interface 428. Gateway device 304 is a device that combines the functions of a modem and a router as discussed above.

In this example, controller 420, memory 422, radio 424, radio 426 and interface 428 are illustrated as individual devices. However, in some embodiments, at least two of controller 420, memory 422, radio 424, radio 426, and interface 428 may be combined as a unitary device. Further, in some embodiments, at least one of controller 420 and memory 422 may be implemented as a computer having tangible computer-readable media for carrying or having computer-executable instructions or data structures stored thereon.

Controller 420 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 304 in accordance with the embodiments described in the present disclosure.

HNC 421 controls extender 302 within the wireless network. HNC 421 may perform tasks such as steering connected devices, a non-limiting example of which is a cell phone, from one access point to another.

Memory 422, as will be described in greater detail below, has instructions, including onboarding program 423, stored therein to be executed by controller 420 to allow gateway device 304 to securely onboard client device 301 and to securely onboard extender 302.

Radios 424 and 426, may include a Wi-Fi WLAN interface radio transceiver that is operable to communicate with client device 301, extender 302 and external server 110. Radios 424 and 426 includes one or more antennas and communicates wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radios 424 and 426 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

In some embodiments, extender 302 may only have one radio. In this sample embodiment, extender 302 has two radios, radios 414 and 416, in order to communicate via multiple bandwidths, non-limiting examples of which include the 2.4 GHz band, 5 GHz band, and 6 GHz band. It should be noted that any number of radios may be included in accordance with aspects of the present disclosure.

Interface 428 can include one or more connectors, such as RF connectors, or Ethernet connectors, and/or wireless communication circuitry, such as 5G circuitry and one or more antennas. Interface 428 receives data from external server 110 by known methods, non-limiting examples of which include terrestrial antenna, satellite dish, wired cable, DSL, optical fibers, or 5G as discussed above.

In operation, with reference to FIGS. 3B and 4, consider the situation wherein client device 301 is joined with the wireless network of gateway device 304, allowing client device 301 access to Internet 112. Controller 400 of client device 301 will execute instructions stored on memory 402 causing client device 301 to request gateway device 304 to provide the wireless network BH credentials, operating channel, country code and any other information needed to onboard onto to gateway device 304 via communication channel 308. Controller 420 of gateway device 304 will execute instructions stored on memory 422 allowing gateway device 304 to provide the wireless network BH credentials, operating channel, country code and any other information needed to onboard onto to gateway device 304, to client device 301 via communication channel 308. Client device 301 will receive the BH credentials, operating channel, country code and any other information needed to onboard onto to gateway device 304.

The data collected by client device 301 from gateway device 304 is necessary for devices to onboard onto gateway device 304. As client device 301 has now joined the wireless network of gateway device 304, client device 301 has access to the wireless network BH credentials, operating channel, country code and any other information needed to onboard onto to gateway device 304. User 102 can use client device 301 to transmit this information to extender 302. With the use of client device 301, extender 302 does not need to be as close to gateway device 304, allowing for greater flexibility of placement for user 102.

Returning to FIG. 2, after the client device joins the wireless network of the gateway device (S204), the user is notified to get closer to the extender (S206). This signifies the beginning of the onboarding of extender 302 and will be described in greater detail with reference to FIG. 3C.

Figure 3C:
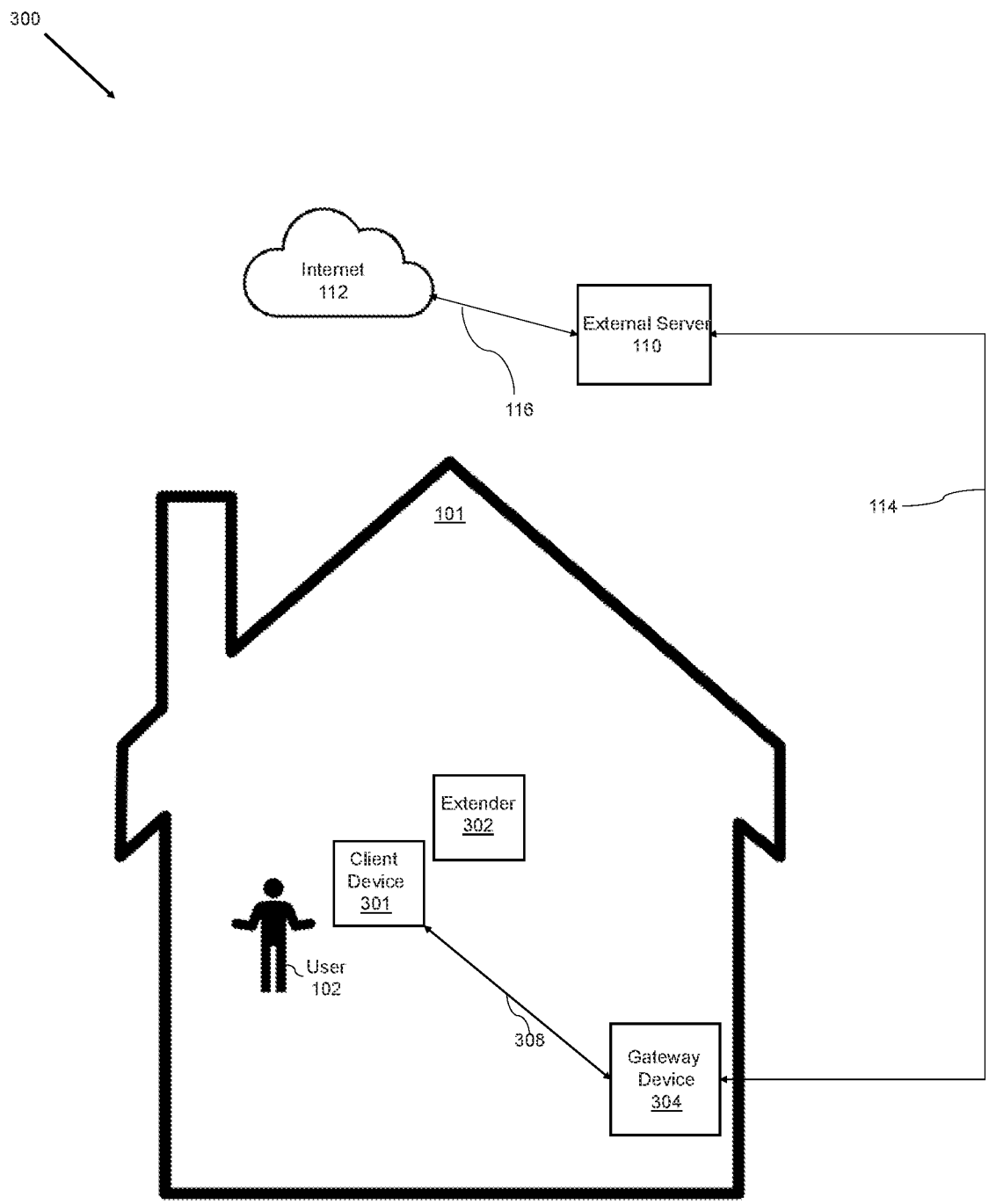
FIG. 3C illustrates the communication system of FIG. 3A at a time $t_4$ in accordance with aspects of the present disclosure.

FIG. 3C illustrates communication system 300 at a time $t_4$ in accordance with the present disclosure.

As shown in FIG. 3C, client device 301 notifies user 102 to get closer to extender 302.

For example, referring to FIG. 4, presume that client device 301 has received the BH credentials, operating channel, country code and any other information needed to onboard onto to gateway device 304. Controller 400 of client device 301 will execute instructions stored on memory 402 causing client device 301 to display a notification via GUI 409 instructing user 102 to move closer to extender 302 in order to begin onboarding extender 302. User 102 will observe the notification and take client device 301 closer to extender 302.

Client device 301 will need to identify extender 302 in order to forward the BH credentials, operating channel, and country code of gateway device 304. When extender 302 is powered on, it will be operating at the minimum transmission power to follow regional transmission power laws. As such, client device 301 will need to be as close as possible to extender 302 in order to identify extender 302 and transmit the necessary information required for extender 302 to onboard to gateway device 304. After receiving this information, extender 302 will be able to surpass the minimum transmission power, and onboard to gateway device 304 in a quicker and more efficient manner.

Returning to FIG. 2, after the user is notified to get closer to the extender (S206), the identification is obtained from the extender (S208). This will be described in greater detail with reference to FIG. 3D.

Figure 3D:
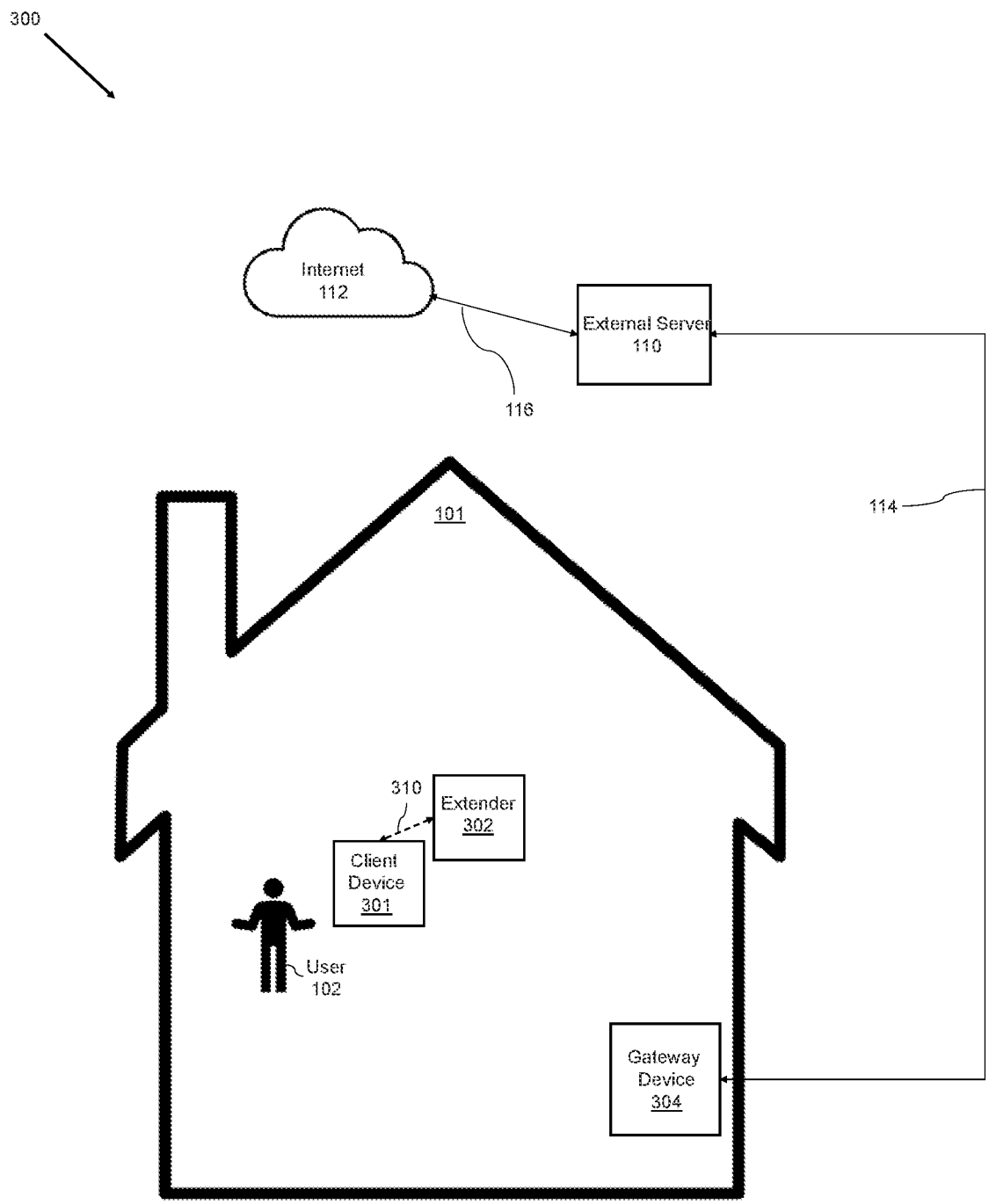
FIG. 3D illustrates the communication system of FIG. 3A at a time is in accordance with aspects of the present disclosure.

FIG. 3D illustrates communication system 300 at a time is in accordance with the present disclosure.

As shown in FIG. 3D, client device 301 will prompt user instructions to begin onboarding extender 302, shown as onboarding process 310.

For example, presume that user 102 has brought client device 301 to extender 302. As referenced in FIG. 4, controller 400 of client device 301 will execute instructions stored on memory 402 causing client device 301 to display instructions via GUI 409 to user 102. User 102 will be prompted to acquire the extender identification data that uniquely identifies extender 302. Non-limiting examples of extender identification data include a serial number or a QR code on extender 302. For example, a QR code may be printed on a label that is disposed on extender 302. In some non-limiting example embodiments, user 102 may quickly obtain a QR code from extender 302 by using camera 404 on client device 301 to image the QR code. The QR code may include information to enable secure communication between extender 302 and client device 301.

Once the extender identification data is obtained by client device 301, controller 400 of client device 301 will execute instructions stored on memory 402 to cause client device 301 to display instructions via GUI 409 to user 102 to prompt user 102 to power on extender 302. Once powered, extender 302 will initially operate at a low transmission power in order to operate at an acceptable power level within all countries and regions. In other words, to operate at a transmission power as defined by a regional power table with minimized power levels to support all countries in the region, that may be preloaded into memory 412 of extender 302.

Until extender 302 receives the country code from client device 301, client device 301 will need to remain close to extender 302. As client device 301 is transmitting the BH credentials, the operating channel, and the country code to extender 302, client device may display a message via GUI 409 instructing user 102 to remain close to extender 302 during the onboarding process.

In some embodiments, extender 302 will be configured to use a provided country code upon first use. For example, presume that residence 101 is within the United States of America. If extender 302 is configured to operate at the United States of America country code, it will do so opposed to operating at the low transmission power level designed for every country and region.

In some embodiments, a country code will not be provided to the extender, e.g., if IEEE 802.11 Wi-Fi protocols are not being used. In such a case, the extender would need to be near the gateway device, assuming that the extender is operating at the minimum transmission power. For example, presume that gateway device 304 does operate using standard Wi-Fi protocols. Client device 301 may not be able to provide the country code to extender 302. User 102 would then need to bring extender 302 closer to gateway device 304 to ensure that extender 302 is able to onboard to gateway device 304 at minimum transmission power.

Returning to FIG. 2, after the identification is obtained from the extender (S208), the client device starts the onboarding process (S210). This will be described in greater detail with reference to FIG. 3E.

Figure 3E:
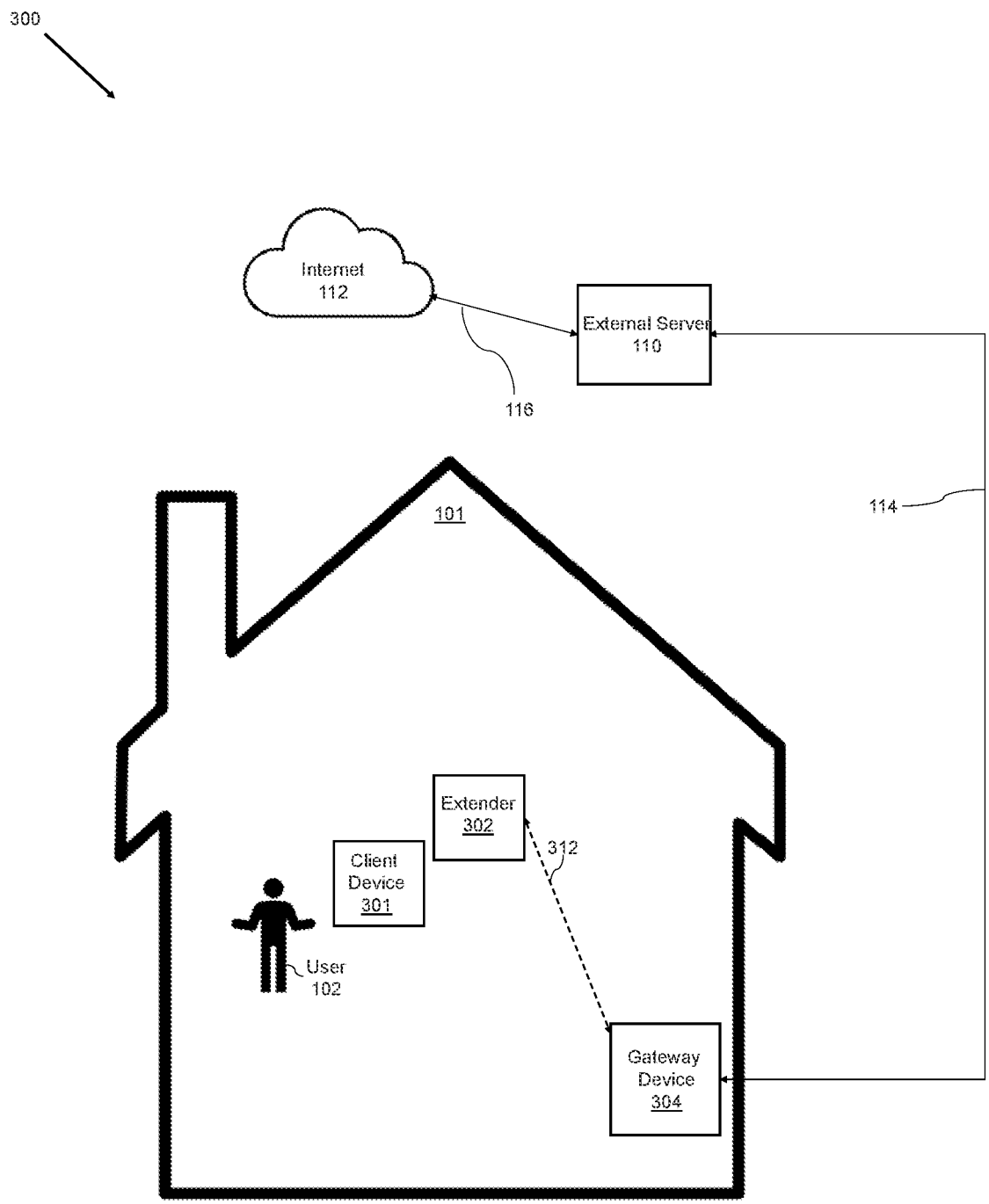
FIG. 3E illustrates the communication system of FIG. 3A at a time $t_6$ in accordance with aspects of the present disclosure.

FIG. 3E illustrates communication system 300 at a time $t_6$ in accordance with the present disclosure.

As shown in FIG. 3E, after extender 302 has received the BH credentials, operating channel, and country code of gateway device 304 from client device 301, it will initiate the onboarding process with gateway device 304 by broadcasting a probe request 312. For example, referring to FIG. 4, after extender 302 receives the BH credentials, operating channel, and country code of gateway device 304 (and any other needed information for onboarding) from client device 301, controller 410 will execute instructions stored on memory 412 to cause extender 302 to begin searching for gateway device 304 via the probe request 312. Once found, extender 302 will establish a BH connection with gateway device 304 using the known BH credentials.

Returning to FIG. 2, after the extender communicates with the gateway device (S210), the client device will wait a predetermined period of time (S212). For example, client device 301 will wait while extender 302 attempts to establish a BH connection with gateway device 304. A non-limiting example of time that client device 301 may wait is 30 seconds. During this time period, client device 301 will continue to display a message to user 102 via GUI 309 instructing user 301 to remain near extender 302.

Returning to FIG. 2, after waiting a predetermined period of time (S212), it is determined if the extender has successfully onboarded (S214). For example, consider the situation wherein user 102 has been waiting near extender 302 with client device 301 for extender 302 to onboard to communication network 300 for the predetermined period of time. Controller 400 will execute instructions stored on memory 402 to cause GUI 309 to determine whether extender 302 has joined the wireless network of gateway device 304. This process may be performed by any known method, non-limiting examples of which include checking the network topology from gateway device 304 and determining whether extender 302 shows up in the network topology or checking the host table of gateway device 304 and determining whether extender 302 shows up on the host table of gateway device 304.

Controller 400 may then execute instructions stored on memory 402 to cause GUI 309 to notify user 102 whether or not extender 302 has successfully onboarded to communication network 300.

Returning to FIG. 2, if it is determined that the extender has not successfully onboarded (N at S214), the user is notified to onboard using the secondary protocol (S216). For example, presume that client device 301 has just notified user 102 via GUI 309 that the predetermined waiting period for extender 302 to onboard the wireless network has timed out. User 102 will be notified to attempt Wi-Fi Protected Setup (WPS) Push Button Configuration (PBC).

In some embodiments, onboarding of the extender to the gateway device will not happen within a predetermined timeout period, a non-limiting example of which may be one minute. For example, consider the situation wherein user 102 has initiated onboarding extender 302 to gateway device

304. Further, consider that after transmitting the BH credentials, operating channel, and country code of gateway device 304, extender 302 has still not joined the wireless network of gateway device 304 after a minute has passed. For example, if a BH connection is established, wherein extender 302 may not connect to the Internet through gateway device 304. As discussed above with respect to the second conventional onboarding process, this can lock extender 302 into an EC onboarding state when such support is not available without a solution to address it.

In such a case, in accordance with aspects of the present disclosure, controller 400 may execute instructions stored on memory 402 to allow client device 301 to display a notification via GUI 409 to user 102 notifying user 102 that they may optionally try another known extender onboarding method, a non-limiting example of which includes Wi-Fi Protected Setup (WPS) Push Button Configuration (PBC). If user 102 chooses to try WPS PBC, client device 301 will notify user 102 if it was successful, in a similar manner to that described above.

Returning to FIG. 2, after the user is notified to onboard using the secondary protocol (S216), the client device again waits the predetermined period of time (return to S212) and it is again determined if the extender has onboarded (return to S214). For example, after user 102 has been notified of the secondary protocol following the timeout of the initial onboarding attempt, user 102 may perform the secondary protocol. Client device 301 will again check the communication network to see if extender 302 has onboarded to the wireless network.

Returning to FIG. 2, if it is determined that the extender has successfully onboarded (Y at S214), then algorithm 200 stops (S218). This will be described in greater detail with reference to FIG. 3F.

Figure 3F:
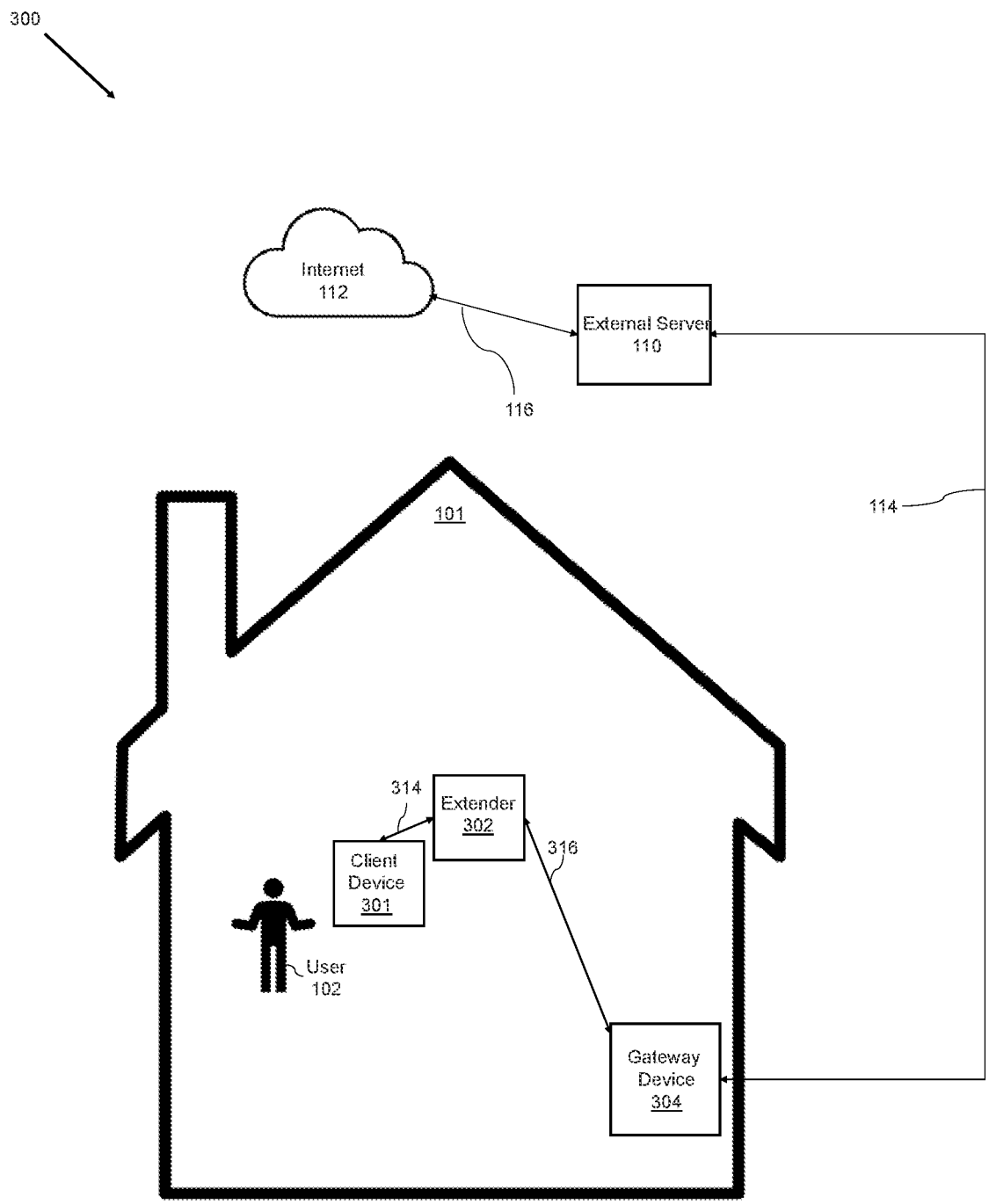
FIG. 3F illustrates the communication system of FIG. 3A at a time $t_7$ in accordance with aspects of the present disclosure.

FIG. 3F illustrates a communication system 300 at a time $t_7$ in accordance with the present disclosure.

As shown in FIG. 3F, after successfully onboarding the wireless network using the BH credentials provided by client device 301, extender 302 establishes communication channel 316 with gateway device 304. Additionally, extender 302 also has access to Internet 112 by way of communication channels 114 and 116. Client device 301 will then establish communication channel 314, allowing client device 301 access to Internet 112. At the same time, referring to FIG. 4, controller 400 will execute instructions stored on memory 402 to allow client device 301 to display a notification via GUI 409 to user 102 notifying user 102 that extender 302 has successfully onboarded the wireless network.

In some embodiments, an extender may onboard through another access point as opposed to directly to gateway device 304. For example, presume that residence 101 includes an additional extender that is already joined with the wireless network of gateway device 304. In such a case, after client device 301 transmits the BH credentials, operating channel, and country code of gateway device 304 to extender 302, extender 302 may connect the extender that is already joined with the wireless network of gateway device 304.

It should be noted that in the above-discussed non-limiting example embodiments, an extender is onboarded onto a gateway device. However, in accordance with aspects of the present disclosure an extender may be onboarded onto any network device within an existing network that is able to onboard the extender, e.g., another already onboarded extender. This will be described in greater detail with reference to FIGS. 5A-B.

It should be noted that additional extenders may be added to the wireless network in a similar manner as discussed above. Extenders may be added in order to further extend the reach of the network of gateway device 304. This will be described in greater detail with reference to FIGS. 5A-B.

Figure 5A:
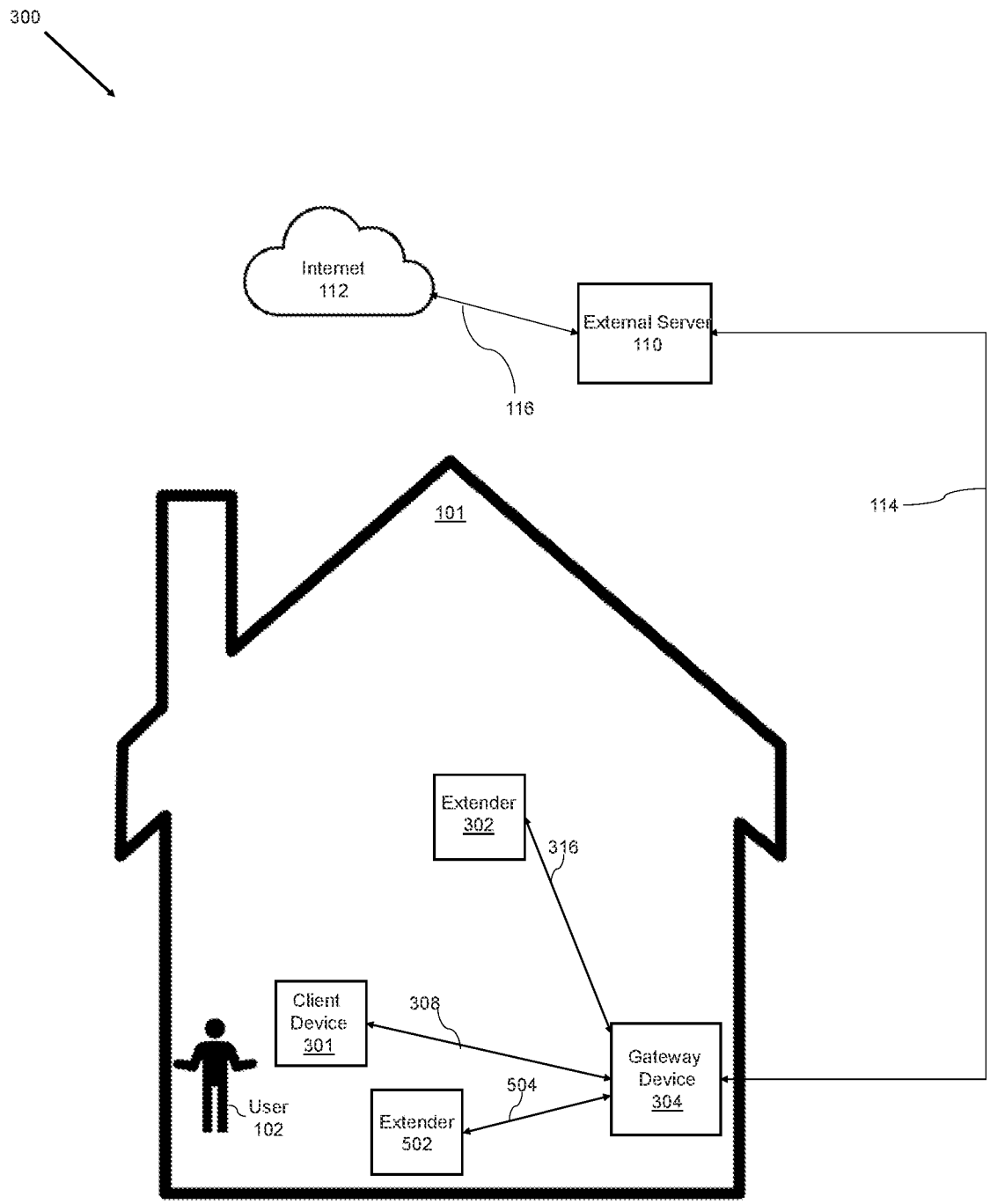
FIG. 5A illustrates the communication system of FIG. 3A in accordance with aspects of the present disclosure, with another extender being added to the network via the gateway device.

FIG. 5A illustrates communication system 300, with another extender being added to the wireless network via gateway device 304.

As shown in the figure, extender 502 joins the network of gateway device 304 by way of gateway device 304. In particular, user 102 may onboard extender 502 onto the network of gateway device 304 in a manner similar to that discussed above with reference to FIGS. 2-4.

In the case of FIG. 5A, extender 502 joins the network of gateway device 304 by onboarding directly onto gateway device 304, as indicated by communication channel 504. However, it should be noted that an extender may join the wireless network of gateway device 304 without onboarding directly to gateway device 304. In particular, an extender may join the wireless network of gateway device 304 by way of onboarding onto another extender that is currently joined in the network of gateway device 304. This will be described in greater detail with reference to FIG. 5B.

Figure 5B:
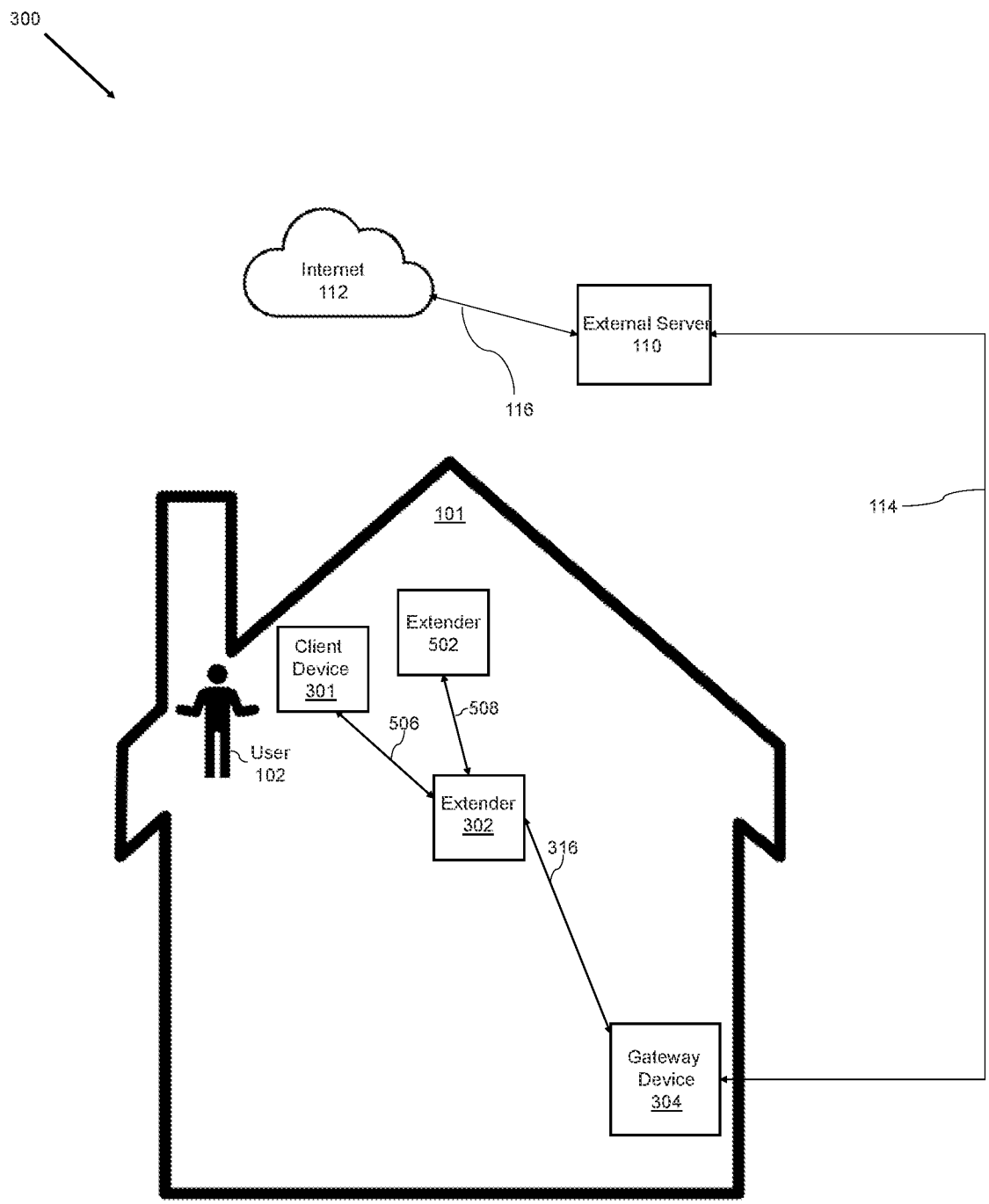
FIG. 5B illustrates the communication system of FIG. 3A in accordance with aspects of the present disclosure, with another extender being added to the network via the previously onboarded extender.

FIG. 5B illustrates the communication system of FIG. 3A in accordance with aspects of the present disclosure, with another extender being added to the wireless network via the previously onboarded extender.

As shown in the figure, extender 502 joins the network of gateway device 304 by way of previously onboarded extender 302. In particular, user 102 may onboard extender 502 onto the network of gateway device 304 by any of the methods discussed above with reference to 2-4.

In the case of FIG. 5B, extender 502 joins the network of gateway device 304, as indicated by communication channel 508, by onboarding onto gateway device 304 by way of previously onboarded extender 302.

It should be noted that in the above-discussion with reference to FIGS. 2-5B, gateway device 304 sets up and manages the wireless network. However, as mentioned above, the wireless network in actuality is typically set up and managed by a network controller, which may reside in any extender, router or gateway device within the wireless network. To simplify the discussion, in the above-described system of FIGS. 2-5B, the network controller resides within gateway device 304. With this in mind, each time a new extender is onboarded onto the wireless network, the new extender in the system discussed above with reference to FIGS. 2-5B, should onboard onto gateway device 304, either directly or via a currently onboarded extender. However, if the network controller were to reside in another device of the wireless network, each time a new extender is onboarded onto the wireless network, the new extender in the system should onboard onto the network device housing the network controller, either directly or via a currently onboarded extender.

Onboarding an extender onto a wireless network can be a tedious process. Due to regional restrictions on transmission power of network devices, many extenders will operate at a minimum transmission power until they are onboarded to a gateway device. Once onboarded, an extender will receive the country code from the gateway device, allowing the extender to operate at the region's respective transmission power. However, as the extender does not know the country code before onboarding, the onboarding process will take longer than if the extender was operating at its regional transmission power. Further, operating at such a low transmission power will require a user to onboard the extender to the gateway device in close proximity. This is unfortunate in cases where a user plans on the extender being in a different physical location than the gateway.

In accordance with a present disclosure, a user will operate a client device that is joined with a wireless network of a gateway device. The client device will receive the BH credentials, operating channel, and country code from the gateway device. The user will be prompted to move the client device closer to an extender, which is to be onboarded to the gateway device. The user will use the client device to receive the extender identification data, e.g., through scanning a QR code associated with the extender. The user will then power on the extender. The client device will transmit the BH credentials, operating channel, and country code of the gateway device to the extender. The extender will use the data transmitted from the client device to start the onboarding process and join the wireless network of the gateway device. The client device will notify the user of the successful onboarding of the extender to the gateway device.

Thus, the present disclosure as disclosed allows a user to operate a client device to onboard an extender to a gateway device by transferring BH credentials, operating channel, and country code of the respective gateway device to the extender from the client device.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed is:

1. A client device for use with a user, a network extender device and a gateway device, the network extender device having extender identification data associated therewith, the gateway device being configured to establish and maintain a wireless network and having backhaul credentials associated therewith and being additionally configured to provide the backhaul credentials, said client device comprising:
   a memory;
   a graphic user interface configured to provide an instruction to the user to place said client device within a predetermined distance from the network extender device; and
   a processor configured to execute instructions stored on said memory to cause said client device to:
      obtain the backhaul credentials from the wireless network;
      obtain the extender identification data from the network extender device;
      instruct said graphic user interface to provide the instruction to the user to place said client device within a predetermined distance from the network extender device;
      communicate with the network extender device based on the extender identification data; and
      provide the backhaul credentials to the network extender device to enable the network extender device to join the wireless network.

2. The client device of claim 1, the extender identification data comprises a QR code from the network extender device, said client device further comprising:
   a camera configured to image the QR code,
   wherein said a processor is configured to execute instructions stored on said memory to cause said client device to further obtain the extender identification data from the network extender device by instructing said camera to image the QR code.

3. The client device of claim 2, wherein said processor is configured to execute instructions stored on said memory to cause said client device to further communicate with the gateway device to verify that the network extender device has joined the wireless network.

4. The client device of claim 3,
   wherein said graphic user interface is additionally configured to provide an instruction to the user to perform a second protocol to join the network extender device with the wireless network, and
   wherein said processor is configured to execute instructions stored on said memory to cause said client device to:
   start a timer to count down for a predetermined time after providing the backhaul credentials to the network extender device to enable the network extender device to join the wireless network; and
   instruct said graphic user interface to provide the instruction to the user to perform the second protocol to join the network extender device with the wireless network if the network extender device has not been verified to have joined the wireless network after expiration of the timer.

5. The client device of claim 1, for additional use with the gateway device having a country code therein and being configured to provide the country code, and for additional use with the network extender device being configured to transmit data at first transmission power and to transmit data a second transmission power based on the country code, the second transmission power being greater than the first transmission power, wherein said processor is configured to execute instructions stored on said memory to cause said client device to further:
   obtain the country code from the gateway device; and
   provide the country code to the network extender device thereby causing the network extender device to transmit data at the second transmission power.

6. The client device of claim 1, wherein said processor is configured to execute instructions stored on said memory to cause said client device to obtain the backhaul credentials from the wireless network in a secure manner.

7. A method of operating a client device with a user, a network extender device and a gateway device, the network extender device having extender identification data associated therewith, the gateway device being configured to establish and maintain a wireless network and having backhaul credentials associated therewith and being additionally configured to provide the backhaul credentials, said method comprising:

obtaining, via a processor configured to execute instructions stored on a memory, the backhaul credentials from the wireless network;

obtaining, via the processor, the extender identification data from the network extender device;

instructing, via a processor, a graphic user interface to provide an instruction to the user to place the client device within a predetermined distance from the network extender device;

communicating, via the processor, with the network extender device based on the extender identification data; and providing, via a processor, the backhaul credentials to the network extender device to enable the network extender device to join the wireless network.

8. The method of claim 7, wherein the extender identification data comprises a QR code from the network extender device, said method further comprising:

obtaining, via a camera, the extender identification data from the network extender device by imaging the QR code.

9. The method of claim 8, further comprising communicating, via the processor, with the gateway device to verify that the network extender device has joined the wireless network.

10. The method of claim 9, further comprising:

starting, via the processor, a timer to count down for a predetermined time after providing the backhaul credentials to the network extender device to enable the network extender device to join the wireless network; and instructing, via the processor, the graphic user interface to provide an instruction to the user to perform a second protocol to join the network extender device with the wireless network if the network extender device has not been verified to have joined the wireless network after expiration of the timer.

11. The method of claim 7, for additional use with the gateway device having a country code therein and being configured to provide the country code, and for additional use with the network extender device being configured to transmit data at first transmission power and to transmit data a second transmission power based on the country code, the second transmission power being greater than the first transmission power, said method further comprising:

obtaining, via the processor, the country code from the gateway device; and providing, via the processor, the country code to the network extender device thereby causing the network extender device to transmit data at the second transmission power.

12. The method of claim 7, wherein said obtaining, via the processor configured to execute instructions stored on the memory, the backhaul credentials from the wireless network comprises obtaining the backhaul credentials from the wireless network in a secure manner.

13. A non-transitory, computer-readable media having computer-readable instructions stored thereon, the computer-readable instructions being capable of being read by a client device for use with a user, a network extender device and a gateway device, the network extender device having extender identification data associated therewith, the gateway device being configured to establish and maintain a wireless network and having backhaul credentials associated therewith and being additionally configured to provide the backhaul credentials, wherein the computer-readable instructions are capable of instructing the client device to perform the method comprising:

obtaining, via a processor configured to execute instructions stored on a memory, the backhaul credentials from the wireless network;

obtaining, via the processor, the extender identification data from the network extender device;

instructing, via a processor, a graphic user interface to provide an instruction to the user to place the client device within a predetermined distance from the network extender device;

communicating, via the processor, with the network extender device based on the extender identification data; and providing, via a processor, the backhaul credentials to the network extender device to enable the network extender device to join the wireless network.

14. The non-transitory, computer-readable media of claim 13, wherein the extender identification data comprises a QR code from the network extender device, and wherein the computer-readable instructions are capable of instructing the client device to perform the method further comprising obtaining, via a camera, the extender identification data from the network extender device by imaging the QR code.

15. The non-transitory, computer-readable media of claim 14, wherein the computer-readable instructions are capable of instructing the client device to perform the method further comprising communicating, via the processor, with the gateway device to verify that the network extender device has joined the wireless network.

16. The non-transitory, computer-readable media of claim 15, wherein the computer-readable instructions are capable of instructing the client device to perform the method further comprising:

starting, via the processor, a timer to count down for a predetermined time after providing the backhaul credentials to the network extender device to enable the network extender device to join the wireless network; and instructing, via the processor, the graphic user interface to provide an instruction to the user to perform a second protocol to join the network extender device with the wireless network if the network extender device has not been verified to have joined the wireless network after expiration of the timer.

17. The non-transitory, computer-readable media of claim 13, for additional use with the gateway device having a country code therein and being configured to provide the country code, and for additional use with the network extender device being configured to transmit data at first transmission power and to transmit data a second transmission power based on the country code, the second transmission power being greater than the first transmission power, wherein the computer-readable instructions are capable of instructing the client device to perform the method further comprising:

obtaining, via the processor, the country code from the gateway device; and providing, via the processor, the country code to the network extender device thereby causing the network extender device to transmit data at the second transmission power.

18. The non-transitory, computer-readable media of claim 13, wherein the computer-readable instructions are capable of instructing the client device to perform the method wherein said obtaining, via the processor configured to execute instructions stored on the memory, the backhaul credentials from the wireless network comprises obtaining the backhaul credentials from the wireless network in a secure manner.

\* \* \* \* \*